(12) United States Patent
Forutanpour et al.

(10) Patent No.: US 10,102,610 B2
(45) Date of Patent: Oct. 16, 2018

(54) DUAL FISHEYE IMAGES STITCHING FOR SPHERICAL VIDEO

(71) Applicant: QUALCOMM Incorporated, San Deigo, CA (US)

(72) Inventors: Bijan Forutanpour, San Diego, CA (US); Phi Hung Le Nguyen, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 15/270,650

(22) Filed: Sep. 20, 2016

(65) Prior Publication Data

US 2017/0287107 A1 Oct. 5, 2017

Related U.S. Application Data

(60) Provisional application No. 62/318,610, filed on Apr. 5, 2016.

(51) Int. Cl.
| | | |
|---|---|---|
| *G06T 3/00* | (2006.01) | |
| *G06T 17/20* | (2006.01) | |
| *G06T 19/20* | (2011.01) | |
| *G06T 15/04* | (2011.01) | |
| *G06T 15/00* | (2011.01) | |
| *G06T 3/40* | (2006.01) | |

(52) U.S. Cl.
CPC .......... *G06T 3/0062* (2013.01); *G06T 3/0018* (2013.01); *G06T 3/4038* (2013.01); *G06T 15/005* (2013.01); *G06T 15/04* (2013.01); *G06T 17/205* (2013.01); *G06T 19/20* (2013.01); *G06T 2215/06* (2013.01)

(58) Field of Classification Search
None
See application file for complete search history.

(56) References Cited

U.S. PATENT DOCUMENTS

| | | |
|---|---|---|
| 6,643,413 B1 | 11/2003 | Shum et al. |
| 6,750,860 B1 | 6/2004 | Shum et al. |
| 2005/0012745 A1 | 1/2005 | Kondo et al. |
| 2006/0050074 A1 | 3/2006 | Bassi |
| 2008/0284797 A1 | 11/2008 | Hack |

(Continued)

FOREIGN PATENT DOCUMENTS

| | | |
|---|---|---|
| EP | 1580986 A2 | 9/2005 |
| TW | 201510933 A | 3/2015 |

(Continued)

OTHER PUBLICATIONS

Response to Written Opinion from corresponding PCT Application Serial No. PCT/US2017/014725 filed on Sep. 12, 2017 (29 pages).

(Continued)

*Primary Examiner* — Kee M Tung
(74) *Attorney, Agent, or Firm* — Shumaker & Sieffert, P.A.

(57) ABSTRACT

Examples are described for overlaying circular images onto a three-dimensional mesh model to generated respective portions of image content for 360-degree viewable content, where each of the portions is a sub-capsule that is larger than half of the sphere. The portions are rendered and then blended based on overlapping portions of the image content from the 360-degree viewable content.

30 Claims, 10 Drawing Sheets

(56) References Cited

U.S. PATENT DOCUMENTS

| | | | |
|---|---|---|---|
| 2012/0169842 A1 | 7/2012 | Chuang et al. | |
| 2014/0071227 A1 | 3/2014 | Takenaka et al. | |
| 2014/0085295 A1* | 3/2014 | Li | G06T 15/04 345/419 |
| 2014/0132788 A1 | 5/2014 | Ramsay et al. | |
| 2014/0176542 A1 | 6/2014 | Shohara et al. | |
| 2015/0131924 A1 | 5/2015 | He et al. | |
| 2015/0254871 A1 | 9/2015 | MacMillan et al. | |
| 2016/0050369 A1 | 2/2016 | Takenaka et al. | |
| 2016/0142697 A1 | 5/2016 | Budagavi et al. | |
| 2016/0379335 A1 | 12/2016 | Kwon et al. | |
| 2017/0116703 A1* | 4/2017 | Sundareson | G06T 1/20 |
| 2017/0287200 A1 | 10/2017 | Forutanpour et al. | |

FOREIGN PATENT DOCUMENTS

| | | |
|---|---|---|
| WO | 0122728 A1 | 3/2001 |
| WO | 2008099269 A2 | 8/2008 |
| WO | 2013130082 A1 | 9/2013 |
| WO | 2014043814 A1 | 3/2014 |
| WO | 2014162324 A1 | 10/2014 |

OTHER PUBLICATIONS

Co-pending U.S. Appl. No. 15/367,061, filed Dec. 1, 2016.

International Search Report and Written Opinion—PCT/US2017/014725—ISA/EPO—dated Apr. 19, 2017 (15 pages).

Davide Scaramuzza, "OCamCalib: Omnidirectional Camera Calibration Toolboc for Matlab: Omnidirectional Camera Calibration Toolbox for Matlab (for Windows, MacOS & Linux)—For catadioptric and fisheye cameras up to 195 degrees", Universit of Zurich, Robotics Swiss National Centre of Competence Research, Sep. 15, 2016, 34 pp.

Liao et al, "Real-Time Spherical Panorama Image Stitching Using OpenCL", 2011 International Conference on Computer Graphics and Virtual Reality, Jul. 18-21, 2011, Las Vegas, NV, USA, Jul. 2011, 7 pp.

Deng et al., "Automatic Spherical Panorama Generation with Two Fisheye Images", Proceedings of the 7th World Congress on Intelligent Control and Automation, Jun. 25 through 27, 2008, Chongqing, CN, published on IEE Explore on Aug. 8, 2008, 5 pp.

Katherine A. Scott, "Fish Eye Lense Dewarping and Panorama Stitching", URL: http://www.kscottz.com/fish-eye-lens-dewarping-and-panorama-stiching ; Aug. 15, 2013, 3 pp.

Paul Bourke, "Converting a fisheye image into a panomic, spherical or perspective projection", URL: http://paulbourke.net/dome/fish2/; originally uploaded n Nov. 2004, article updated Jul. 2006, 17 pp.

Second Written Opinion from corresponding PCT Application Serial No. PCT/US2017/014725 dated Mar. 14, 2018, (7 pages).

International Preliminary Report on Patentability from International Application PCT/US2017/014725, dated Jun. 25, 2018, 24 pp.

* cited by examiner

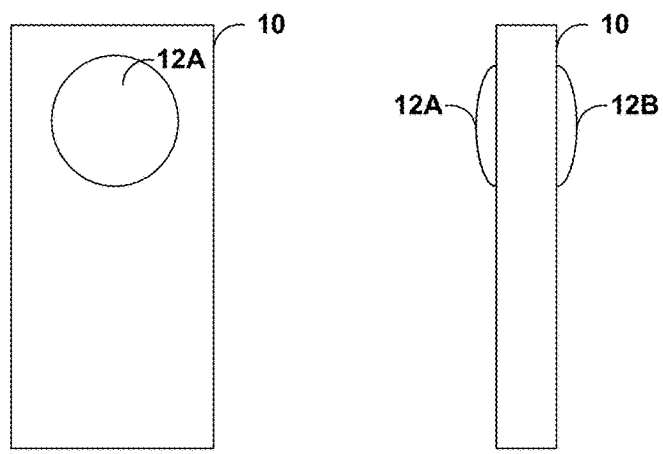
FIG. 1
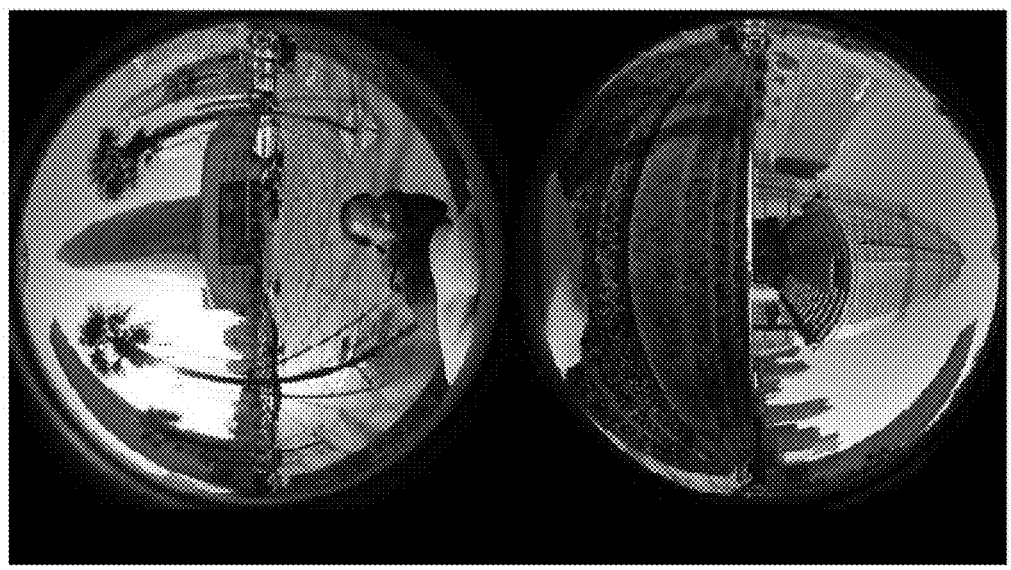
FIG. 2A          FIG. 2B

DUAL FISHEYE IMAGES STITCHING FOR SPHERICAL VIDEO

This application claims the benefit of U.S. Provisional Application No. 62/318,610, filed Apr. 5, 2016, the entire content of which is incorporated by reference herein.

TECHNICAL FIELD

The disclosure relates to spherical video rendering.

BACKGROUND

In certain types of video rendering, such as 360-degree video, a viewer can perceive multiple different views of the image content. For instance, while a viewer is viewing the image content on a display, the viewer can select a different view from which to view the content. For 360-degree video, the viewer can interface with the display to change the angle from which the viewer is viewing the image content.

SUMMARY

In general, this disclosure describes techniques for generating 360-degree image content by stitching together image content captured by two cameras, each camera having a fisheye lens. The two cameras together capture 360-degrees of image content (e.g., a sphere of image content). In examples described in this disclosure, each camera may capture more than half of the sphere, and the overlapping portion from each of the captured video content is used to determine the manner in which to stitch the captured video content.

The two captured portions of the image content may be referred to as a first portion of the image content and a second portion of the image content, and image content of the first portion and the second portion may be less than the entire sphere of image content. The image content of the first portion may be more than half of the image content of the sphere of image content, and the image content of the second portion may be more than half of the image content of the sphere of image content.

A graphics processing unit (GPU) may utilize texture mapping techniques to overlay the captured image content onto 3D mesh models. Because each portion includes more than half of the sphere of image content, there is overlapping image content in the first and second portions. In generating the image content for the sphere of image content, the GPU may account of the overlapping image content by blending the image content in the overlapping portion.

In one example, the disclosure describes a method for generating image content, the method comprising overlaying a first image on a first three-dimensional (3D) mesh model based on a first set of vertex coordinates for the first 3D mesh model to generate a first portion of image content, overlaying a second image on a second 3D mesh model based on a second set of vertex coordinates for the second 3D mesh model to generate a second portion of the image content, wherein the first portion and the second portion include overlapping image content, rendering the first portion and the second portion to generate a rendered first portion and a rendered second portion, respectively, and generating a sphere of image content based at least in part on blending the first rendered portion and the second rendered portion based on the overlapping image content.

In another example, the disclosure describes a device for generating image content, the device comprising a memory configured to store a first image and a second image, and a graphics processing unit (GPU). The GPU comprising at least one of fixed-function or programmable circuitry configured to overlay the first image stored in the memory on a first three-dimensional (3D) mesh model based on a first set of vertex coordinates for the first 3D mesh model to generate a first portion of image content, overlay the second image stored in the memory on a second 3D mesh model based on a second set of vertex coordinates for the second 3D mesh model to generate a second portion of the image content, wherein the first portion and the second portion include overlapping image content, render the first portion and the second portion to generate a rendered first portion and a rendered second portion, respectively, and generate a sphere of image content based at least in part on blending the first rendered portion and the second rendered portion based on the overlapping image content.

In another example, the disclosure describes a device for generating image content, the device comprising means for overlaying a first image on a first three-dimensional (3D) mesh model based on a first set of vertex coordinates for the first 3D mesh model to generate a first portion of image content, means for overlaying a second image on a second 3D mesh model based on a second set of vertex coordinates for the second 3D mesh model to generate a second portion of the image content, wherein the first portion and the second portion include overlapping image content, means for rendering the first portion and the second portion to generate a rendered first portion and a rendered second portion, respectively, and means for generating a sphere of image content based at least in part on blending the first rendered portion and the second rendered portion based on the overlapping image content.

In another example, the disclosure describes a computer-readable storage medium comprising instructions that when executed cause one or more processors of a device for generating image content to overlay a first image on a first three-dimensional (3D) mesh model based on a first set of vertex coordinates for the first 3D mesh model to generate a first portion of image content, overlay a second image on a second 3D mesh model based on a second set of vertex coordinates for the second 3D mesh model to generate a second portion of the image content, wherein the first portion and the second portion include overlapping image content, render the first portion and the second portion to generate a rendered first portion and a rendered second portion, respectively, and generate a sphere of image content based at least in part on blending the first rendered portion and the second rendered portion based on the overlapping image content.

The details of one or more examples are set forth in the accompanying drawings and the description below. Other features, objects, and advantages will be apparent from the description, drawings, and claims.

BRIEF DESCRIPTION OF DRAWINGS

FIG. 1 is a block diagram illustrating an example device for capturing 360-degree video in accordance with one or more example techniques described in this disclosure.

FIGS. 2A and 2B are pictorial diagrams illustrating images captured from the device of FIG. 1.

DETAILED DESCRIPTION

Figure 3:
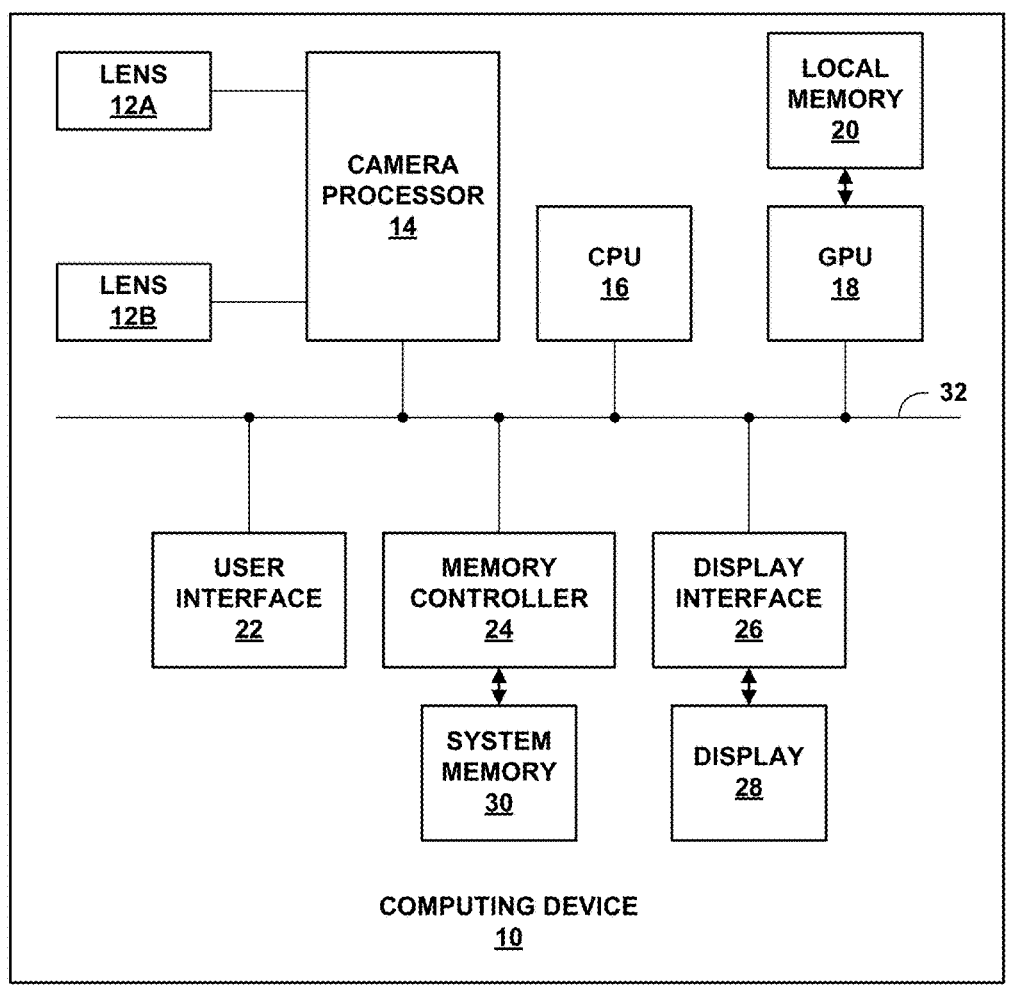
FIG. 3 is a block diagram of a device configured to perform one or more of the example techniques described in this disclosure.

The example techniques described in this disclosure are related to generating 360-degree video or image. In 360-degree video or image, the video/image content forms a conceptual sphere around the viewer. The viewer can view image content from multiple perspectives (e.g., in front, behind, above, and all around), and such image content is called 360-degree image.

In this disclosure, an image that includes 360-degrees of image content or viewable content means that the image includes content for all perspectives (e.g., content above, below, behind, in front, and on each sides). For instance, conventional images capture slightly less than 180-degree of image content, and do not capture content on the sides of the camera.

In general, 360-degree video is formed from a sequence of 360-degree images. Accordingly, the example techniques described in this disclosure are described with respect to generating 360-degree image content. Then, for 360-degree video content, these 360-degree images can be displayed sequentially. In some examples, a user may desire to take only a 360-degree image (e.g., as a snapshot of the entire 360-degree surrounding of the user), and the techniques described in this disclosure are applicable to such example cases as well.

The techniques may be applicable to captured video content, virtual reality, non-cv module, etc. The techniques may be used in mobile devices, but the techniques should not be considered limited to mobile applications. In general, the techniques may be for virtual reality applications, video game applications, or other applications where 360-degree spherical video/image environments are desired.

The 360-degree image content may be captured with a camera device that includes two fisheye lenses (e.g., positioned to capture opposite portions of the sphere of image content). The two fisheye lenses capture respective portions of the full sphere of the 360-degree video. However, the images generated by the captured portions are circular images (e.g., one image frame includes two circular images).

The example techniques described in this disclosure describes ways to generate a 360-degree image using the two circular images. A graphics processing unit (GPU) utilizes texture mapping techniques to render the two circular images, each having a portion of a sphere of image content, and then blends the rendered portions of the image content to generate the sphere of image content. For instance, a central processing unit (CPU) generates a three-dimensional (3D) mesh model, where the 3D mesh model includes a plurality of primitives having vertex coordinates. The CPU also generates a plurality of texture coordinates that correspond to the vertex coordinates. These texture coordinates are coordinates for image pixels within the two circular images. In this way, the circular images form the textures (e.g., color textures) that the GPU texture maps to the 3D mesh model.

The GPU may overlay the circular images onto the 3D mesh model based on the texture coordinates and the vertex coordinates of the 3D mesh model. For example, the GPU may receive instructions that indicate the vertex coordinates of a 3D mesh model and the corresponding texture coordinates of a color texture (e.g., a circular image). In response to the instructions, the GPU may overlay the circular images on respective 3D mesh models to generate a first portion of the image content and a second portion of the image content, respectively.

The GPU may render the two portions of the image content. Because the two portions represent the image content from the two circular images, the combination of the two portions represents the entire sphere of image content (e.g., 360-degree of viewable content). However, as described above, each of the circular images includes more than half a sphere of image content (e.g., more than 180-degree of image content). Accordingly, the two portions of image content each represent more than 180-degree of image content. Therefore, there is overlapping image content of the sphere of image content in the two portions. The GPU may blend the overlapping image content of the two rendered portions to generate the sphere of image content.

As an example, assume that the first fisheye lens is pointing in a first direction and captures 200 degrees of image content. Assume that the second fisheye lens is pointing in a second, opposite direction to the first direction and captures 200 degrees of image content. In this example, a first portion of the image content will include 200 degrees of image content, and a second portion of the image content will include 200 degrees of image content. However, there will be approximately 20 degrees of overlapping image content in the first and second portions. This overlapping image content will appear on the ends of the two portions.

In examples described in this disclosure, the GPU may utilize this overlapping image content to blend the first and second portions. For example, the GPU may assign blending factors to points within the first and second portions, and use these blending factors to blend the first and second portions. There may be various ways to assign blending factors, such as using a mask based on the texture coordinates, as described in more detail.

As described above, the CPU determines texture coordinates based on the image pixels of the circular images. In some examples, the CPU may determine the texture coordinates based on vertices of primitives that form a pattern of concentric rings and the image pixels of the circular images. The width of rings in the concentric rings need not necessarily all be of the same width. For example, one or more of the outer rings may have a smaller width than other rings.

As described in more detail, by having a smaller width in the texture coordinates, the GPU naturally stretches out the corresponding texture during the texture mapping, which may be useful to compensate for the compression that results in the circular images. In the circular images, the image content on the edges becomes compressed, and without correction can potentially cause poor image quality.

The GPU stretches out the corresponding texture based on the smaller width in the texture coordinates. This can be conceptually considered as mapping a skinny rectangle onto a wider rectangle. For instance, assume that the texture coordinates for primitives in the inner rings form square-like primitives, and that the texture coordinates for primitives in the outer ring forms rectangle-like primitives having a smaller width (e.g., 23% less width). Assume that the size of the primitives in the 3D mesh model is same. Therefore, to map texture coordinates for primitives in the outer ring to corresponding vertex coordinates in the 3D mesh model would result in stretching the texture (e.g., circular images) relative to the mapping of texture coordinates for primitives in the other rings to corresponding vertex coordinates in the 3D mesh model.

The example techniques described in this disclosure allow for generating 360-degrees of image content (e.g., a sphere of image content) directly from the circular images without necessarily going through a process of converting the circular images to a non-circular images. For instance, some other techniques convert circular images to non-circular images, which requires additional processing time. Furthermore, by using texture coordinates for primitives having different widths, the example techniques described in this disclosure correct for the compression in the circular images, thereby generating a more accurate image.

FIG. 1 is a block diagram illustrating an example device for capturing 360-degree video in accordance with one or more example techniques described in this disclosure. There is a new class of camera entering the marketplace where two fisheye lenses capture and record a 360 spherical environment and creates two fisheye video streams. As illustrated, computing device 10 is a video capture device that includes fisheye lens 12A and fisheye lens 12B located on opposite sides of computing device 10 to capture full 360-degree video content. Other orientations of fisheye lens 12A and 12B may be possible. As described above, the 360-degree video content may be considered as a sequence of 360-degree images (e.g., frames of the video). The example techniques described in this disclosure describe techniques related to the images, which can be used for purposes of still images (e.g., 360-degree snapshot) or for images that form a video (e.g., 360-degree video).

A viewer may interact with computing device 10 to capture the 360-degree video/image, where each one of fisheye lens 12A and 12B captures a portion of the 360-degree video/image, and the two video/image streams from the fisheye lens 12A and 12B are blended together to create the 360-degree video/image. In some cases, the blending together of the video/image streams may cause a visible seam between the two streams.

There may be various ways in which a viewer interacts with computing device 10. As one example, the viewer may interact with computing device 10 with a push button located on computing device 10. As another example, a viewer may interact with computing device 10 via a displayed interface (e.g., graphical user interface (GUI)).

In some examples, computing device 10 may be a camera device (e.g., fisheye camera device) that provides no display and may or may not have onboard processing capabilities. In some examples, computing device 10 outputs the captured image to another device for processing (e.g., a processing device). This processing device may provide the primary or secondary mechanism for viewer interaction. For example, the viewer may execute an application on the processing device that causes computing device 10 to sink with the processing device, where the processing device is the master and computing device 10 is the slave. The viewer may then, via the processing device, cause computing device 10 to capture a 360-degree image, and computing device 10 outputs the images back to the processing device for display. In some examples, even when a processing device is used to capture the 360-degree image, the viewer may still interact with computing device 10 for capturing the 360-degree image but computing device 10 will output the image to the processing device for display.

FIGS. 2A and 2B are pictorial diagrams illustrating an image captured from the device of FIG. 1. As illustrated, the output of the two images captured by lenses 12A and 12B are circular images (e.g., round images). For example, FIG. 2A represents the image captured by lens 12A, and FIG. 2B represents the image captured by lens 12B. In response to a viewer interaction to capture an image, a camera processor, illustrated in FIG. 3, receives the image content captured by lens 12A and 12B and processes the image content to generate FIGS. 2A and 2B. In some examples, FIGS. 2A and 2B may be part of a common image frame.

As illustrated, FIGS. 2A and 2B are circular images illustrating image content that appears bubble-like. If the two circular images are stitched together, the resulting image content would be for the entire sphere of image content (e.g., 360-degree of viewable content).

However, the images captured by lenses 12A and 12B encompass more than half of the 360-degree of viewable content. To capture half of the 360-degree of viewable content, lens 12A would have captured 180-degree of the 360-degrees of viewable content, and lens 12B would have captured the other 180-degree of the 360-degrees of viewable content. In some examples, lenses 12A and 12B may each capture more than 180-degrees of the 360-degrees of viewable content. For instance, lenses 12A and 12B may capture approximately 200-degrees of the viewable content (e.g., content slightly behind the side of computing device 10 and extending all around).

Because each of lenses 12A and 12B capture more than 180-degrees of the 360-degrees of viewable content, there is some image content overlap in the images generated from the content captured by lenses 12A and 12B. In the example techniques described in this disclosure, a graphics processing unit (GPU), as illustrated in FIG. 3, may utilize this overlap in image content to blend the sphere of image content for display.

The GPU that generates the sphere of image content for display based on the captured images from lenses 12A and 12B may be on the same device as lenses 12A and 12B (e.g., part of computing device 10 where computing device 10 is a fisheye camera device), or may be in a separate processing device (e.g., a separate handheld device or a fixed device). In examples, where the GPU is in a separate processing device, computing device 10 may output the image content of FIGS. 2A and 2B to the processing device. Computing device 10 and the processing device may be coupled wirelessly, through a wired link, or via a network (e.g., Internet or LAN). The processing device may then render the captured images, and blend the resulting rendered images, for display in accordance with the example techniques described in this disclosure.

In some examples, computing device 10 may output the captured images (e.g., the images in FIGS. 2A and 2B) to a server. The processing device may download the captured images, render the images, and blend the rendered images to generate the 360-degree images. As an example, an individual may capture 360-degree video (e.g., a sequence of 360-degree images) using computing device 10 of an area of interest (e.g., a concert, a new football stadium, a national park, and the like). The individual may cause computing device 10 to store the captured 360-degree video to a server, and another individual interested in the captured 360-degree video may cause the processing device to download from the server, and generate the images for display.

For ease of description, as described in more detail, the examples are described with respect to computing device 10 capturing the 360-degree image and displaying the 360-degree image. For example, computing device 10 includes the GPU that renders and blends the captured images for display in accordance with the example techniques described in this disclosure. However, the example techniques are not so limited and examples where computing device 10 captures the 360-degree image and outputs the 360-degree image to another processing device are contemplated as well.

In some examples, the GPU that renders and blends the captured images may be located on computing device 10. Rather than outputting the captured images, computing device 10 may render and blend the captured images to generate a sphere of image content. Computing device 10 may then output the sphere of image content to another processing device for display or to the server for later download and display.

As can be seen from FIGS. 2A and 2B, there may be certain artifacts in the captured images. For instance, due to the bubble-like nature of the circular images illustrated in FIGS. 2A and 2B, the image content on the edges (e.g., along the circumference of the images) becomes compressed. Without compensating for the compression, the resulting sphere of image content may not appear smooth and include compressed image content. As described in more detail, the GPU may utilize texture mapping techniques with different sized texture primitives to stretch out the compressed image content.

The techniques described in this disclosure should not be confused with panoramic imaging techniques. In panoramic imagining, a viewer takes a plurality of rectangular images by moving the camera device around, where each image captures less than 180-degree of image content. The camera device then stitches these different images together. In the examples described in disclosure, the circular images include more than 180-degree image content and may, but not necessarily, have image compression along the circumference of the image.

This disclosure describes examples techniques to provide a high performance, high quality combination of the two streams of video data generated by the two cameras. The result may have minimal or non-existent visual seams, and be tolerant to motion by the user and environment.

In the example techniques described in this disclosure, processing circuitry of the GPU may blend the video content from the two portions of the image content captured by lenses 12A and 12B. As described above, the GPU may be within computing device 10 or may be in another device that receives the image content captured by lenses 12A and 12B.

FIG. 3 is a block diagram of a device configured to perform one or more of the example techniques described in this disclosure. Examples of computing device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA). Additional examples of computing device 10 include a personal music player, a video player, a display device, a camera, a television, a set-top box, a broadcast receiver device, a server, an intermediate network device, a mainframe computer or any other type of device that processes and/or displays graphical data.

As illustrated in the example of FIG. 3, computing device 10 includes first fisheye lens 12A and second fisheye lens 12B, at least one camera processor 14, a central processing unit (CPU) 16, a graphical processing unit (GPU) 18 and local memory 20 of GPU 18, user interface 22, memory controller 24 that provides access to system memory 30, and display interface 26 that outputs signals that cause graphical data to be displayed on display 28. Although FIG. 3 illustrates fisheye lenses 12A and 12B as part of the same device that includes GPU 18, the techniques described in this disclosure are not so limited. In some examples, GPU 18 and many of the various other components illustrated in FIG. 3 may be on a different device (e.g., a processing device), where the captured video content from lenses 12A and 12B is outputted to the processing device that includes GPU 18 for post-processing and blending of the image content to generate the 360-degree video/image.

Also, although the various components are illustrated as separate components, in some examples the components may be combined to form a system on chip (SoC). As an example, camera processor 14, CPU 16, GPU 18, and display interface 26 may be formed on a common integrated circuit (IC) chip. In some examples, one or more of camera processor 14, CPU 16, GPU 18, and display interface 26 may be in separate IC chips. Various other permutations and combinations are possible, and the techniques should not be considered limited to the example illustrated in FIG. 3.

The various components illustrated in FIG. 3 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 3 communicate with each other using bus 32. Bus 32 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXensible Interface (AXI) bus) or another type of bus or device interconnect. It should be noted that the specific configuration of buses and communication interfaces between the different components shown in FIG. 3 is merely exemplary, and other configurations of computing devices and/or other image processing systems with the same or different components may be used to implement the techniques of this disclosure.

Camera processor 14 may be external to computing device 10; however, it may be possible for camera processor 14 to be internal to computing device 10, as illustrated. For ease of description, the examples are described with respect to the configuration illustrated in FIG. 3.

Camera processor 14 is configured to receive the electrical currents as sensor signals from respective pixels of lens 12A and 12B and process the electrical currents to generate pixel data of respective fisheye images (e.g., the circular images). Although one camera processor 14 is illustrated, in some examples, there may be a plurality of camera processors (e.g., one for lens 12A and one for lens 12B). Accordingly, in some examples, there may be one or more camera processors like camera processor 14 in computing device 10.

In some examples, camera processor 14 may be configured as a single-input-multiple-data (SIMD) architecture. Camera processor 14 may perform the same operations on current received from each of the pixels on each of lens 12A and 12B. Each lane of the SIMD architecture may include an image pipeline. The image pipeline includes hardwire circuitry and/or programmable circuitry (e.g., at least one of fixed-function or programmable circuitry) to process the output of the pixels.

For example, each image pipeline of camera processor 14 may include respective trans-impedance amplifiers (TIAs) to convert the current to a voltage and respective analog-to-digital converters (ADCs) that convert the analog voltage output into a digital value. The current outputted by each pixel indicates the intensity of a red, green, or blue component.

In addition to converting analog current outputs to digital values, camera processor 14 may perform some additional post-processing to increase the quality of the final image. For example, camera processor 14 may evaluate the color and brightness data of neighboring image pixels and perform demosaicing to update the color and brightness of the image pixel. Camera processor 14 may also perform noise reduction and image sharpening, as additional examples.

Camera processor 14 outputs the resulting images (e.g., pixel values for each of the image pixels) to system memory 30 via memory controller 24. Each of the images may be a combined together to form the 360-degree video/images. For example, GPU 18 or some other processing unit including camera processor 14 itself may perform the blending to generate the video content. For ease of description, the examples are described with respect to the processing circuitry of GPU 18 performing the operations. However, other processing circuitry may be configured to perform the example techniques. In some cases, GPU 18 may combine the images and generate the 360-degree video/images in real-time, but in other examples, the operations of combining the images to generate the 360-degree video/images need not necessarily be in real-time.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, a word processor application, a web browser application, an email application, a graphics editing application, a spread sheet application, a media player application, a video game application, a graphical user interface application or another program. The user may provide input to computing device 10 via one or more input devices (not shown) such as a keyboard, a mouse, a microphone, a touch pad or another input device that is coupled to computing device 10 via user interface 22.

One example of the software application is the camera application. CPU 16 executes the camera application, and in response, the camera application causes CPU 16 to generate content that display 28 outputs. For instance, display 28 may output information such as light intensity, whether flash is enabled, and other such information. The user of computing device 10 may interface with display 28 to configure the manner in which the images are generated (e.g., with or without flash, and other parameters). The camera application also causes CPU 16 to instruct camera processor 14 to process the images captured by lens 12A and 12B in the user-defined manner.

The software applications that execute on CPU 16 may include one or more graphics rendering instructions that instruct CPU 16 to cause the rendering of graphics data to display 28. In some examples, the software instructions may conform to a graphics application programming interface (API), such as, e.g., an Open Graphics Library (OpenGL®) API, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

As one example, the user may execute the camera application and interact with computing device 10 to capture the 360-degree video. After camera processor 14 stores the resulting images (e.g., the circular images of FIGS. 2A and 2B) in system memory 30, the camera application may cause CPU 16 to instruct GPU 18 to render and blend the images. The camera application may use software instructions that conform to an example API, such as the OpenGL API, to instruct GPU 18 to render and blend the images. As an example, the camera application may issue texture mapping instructions according to the OpenGL API to cause GPU 18 to render and blend the images.

In response to the received instructions, GPU 18 may receive the image content of the circular images and blend the image content to generate the 360-degree video. Display 28 displays the 360-degree video. The user may interact with user interface 22 to modify the viewing perspective so that the viewer can view the full 360-degree video (e.g., view above, behind, in front, and all angles of the 360 sphere).

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example of computing device 10 of FIG. 3 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, and GPU 18. For example, system memory 30 may store user applications (e.g., instructions for the camera application), resulting images from camera processor 14, etc. System memory 30 may additionally store information for use by and/or generated by other components of computing device 10. For example, system memory 30 may act as a device memory for camera processor 14. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 30 may include instructions that cause camera processor 14, CPU 16, GPU 18, and display interface 26 to perform the functions ascribed to these components in this disclosure. Accordingly, system memory 30 may be a computer-readable storage medium having instructions stored thereon that, when executed, cause one or more processors (e.g., camera processor 14, CPU 16, GPU 18, and display interface 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Camera processor 14, CPU 16, and GPU 18 may store image data, and the like in respective buffers that are allocated within system memory 30. Display interface 26 may retrieve the data from system memory 30 and configure display 28 to display the image represented by the generated image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Display 28 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 28 may be integrated within computing device 10. For instance, display 28 may be a screen of a mobile telephone handset or a tablet computer. Alternatively, display 28 may be a stand-alone device coupled to computing device 10 via a wired or wireless communications link. For instance, display 28 may be a computer monitor or flat panel display connected to a personal computer via a cable or wireless link.

In example techniques described in this disclosure, GPU 18 includes a graphics processing pipeline that includes processing circuitry (e.g., programmable circuitry and/or fixed-function circuitry). For example, GPU 18 may include texture hardware circuitry used for performing the operations of the example techniques. GPU 18 may also include processing circuitry for the blending and mask generation for performing the operations of the example techniques.

For instance, GPU 18 may use texture mapping techniques to generate the image content that is to be rendered and blended. Texture mapping generally refers to the process by which an image is overlaid on-top-of (also referred to as "glued" to) a geometry. The image that is to be overlaid may be referred to as a color texture or simply texture, and CPU 16 may define the geometry. The color texture may be a two-dimensional (2D) image that is overlaid onto a 3D mesh model, but other dimensions of the color texture are possible such as 3D image.

As an example to assist with understanding texture mapping in general, the 3D mesh model may be an interconnection of a plurality of primitives that forms a wall, and the color texture may be a 2D image of a mural image. In this example, the geometry on which color texture is overlaid is the wall, and the color texture in the mural image. In texture mapping, CPU 16 outputs instructions to GPU 18 that corresponds 3D coordinates (e.g., x, y, z) of vertices of the primitives that form the wall with texture coordinates of the color texture. In this example, the texture coordinates of the color texture are the image pixel coordinates of the mural image normalized to be between 0 and 1.

Figure 4:
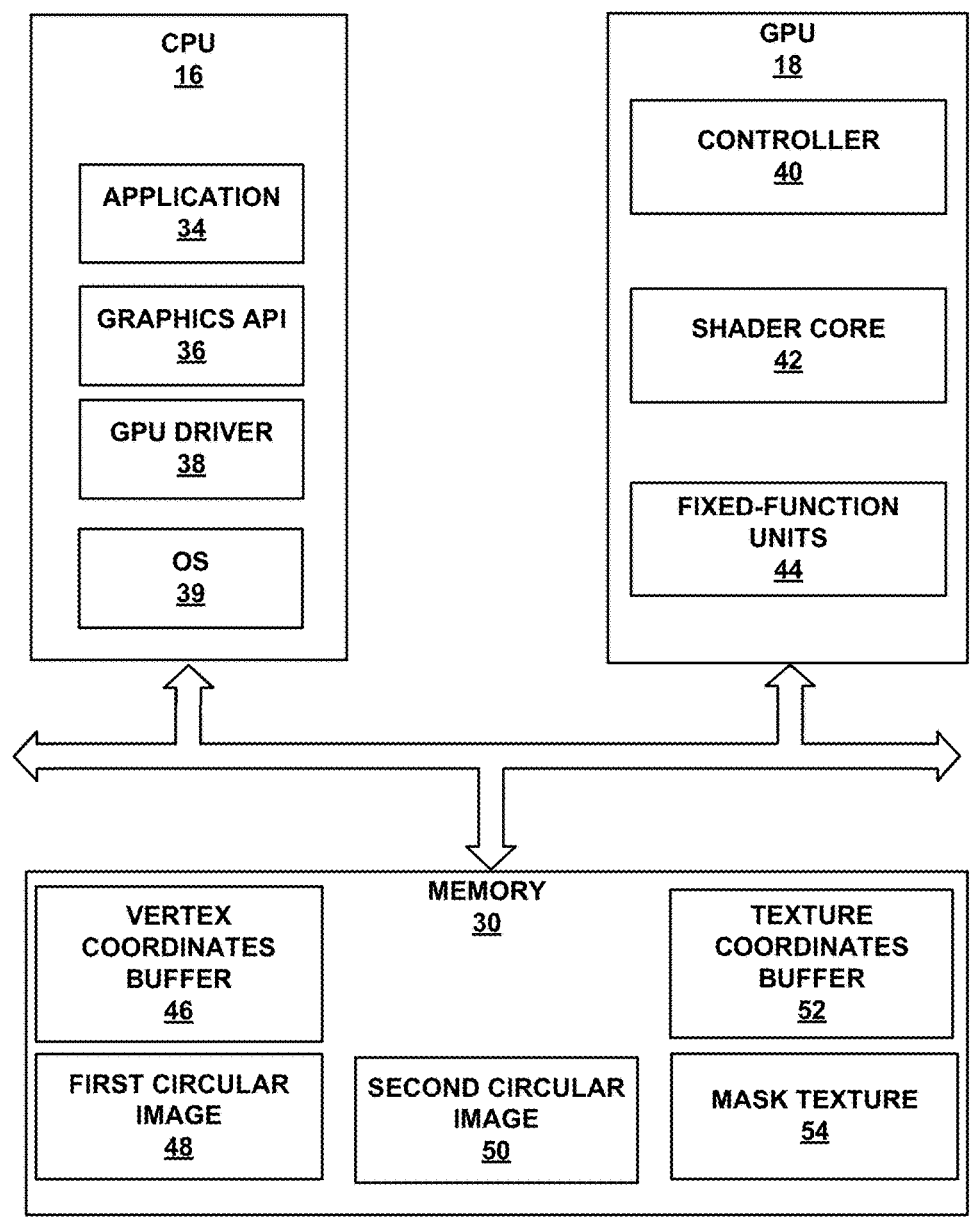
FIG. 4 is a block diagram illustrating a CPU, a GPU and a memory of the computing device of FIG. 3 in further detail.

In the example techniques described in this disclosure, the image generated from content captured by lenses 12A and 12B (e.g., as illustrated in FIGS. 2A and 2B) form a color texture, which may be represented as a bitmap. The texture hardware circuit of GPU 18 performs color texture mapping with the texture coordinates (e.g., as illustrated in FIG. 4). OpenGL uses the bitmap with the texture coordinates, vertex coordinates of the geometry, and connectivity information to generate the video content for the portions of the image content.

CPU 16 may determine the texture coordinates, the vertex coordinates of the geometry on which the color texture is overlaid, and the connectivity information. One example of the geometry on which the color texture is overlaid is a 3D mesh model. The shape of the 3D mesh model may be half-sphere like but having an elongated end. For example, the shape of the 3D mesh model may be a capsule that is cut in half (e.g., half a sphere with additional rings attached at the end). An example of such a 3D mesh model (e.g., capsule cut in half) is referred to as a sub-capsule or elongated half-sphere. In the sub-capsule shape, the distance from the middle point to the apex is greater than the distance from the middle point to the circumference. As a conceptual example, the sub-capsule shape is a sideways silo.

The sub-capsule shape includes a longitudinal axis, where the longitudinal axis comprises an axis extending from center point of one end of the sub-capsule, which forms an open-faced circuit, to a tip of sub-capsule (e.g., the apex). The radius of this open-faced circle may be less than the distance from the center point of the open-faced circle to the tip of the sub-capsule. In the examples described in this disclosure, the 3D mesh model having this sub-capsule shape includes a plurality of rings disposed about a common longitudinal axis. Each of the rings includes a plurality of primitives, and the circular images are overlaid on top of these primitives disposed about the common longitudinal axis of the sub-capsule shape. In some examples, a width of a first ring in the 3D mesh model is less than a width of a second ring in the 3D mesh model.

The term sub-capsule refers generally to a half round shape (e.g., one end forms and open-faced circle). One example of the sub-capsule shape is a sub-ovoid, and other such shapes with a half round shape are possible (e.g., other examples of sub-capsules are possible).

Moreover, the example techniques are not limited to sub-capsule shape for the 3D mesh model, and other shapes are possible as well. For instance, the shape of the 3D mesh model may be cubic and other possible shapes. In each of these examples, there is a longitudinal axis through the 3D mesh model, and the rings of primitives are disposed about this common longitudinal axis. The circular images may be overlaid on top of these primitives, similar to the description above.

There may be various shapes of the primitives of the 3D mesh model. As one example, CPU 16 (e.g., via the camera application executing on CPU 16 or via information pre-generated and stored) may define the 3D mesh model as formed with a plurality of primitives (e.g., square primitives). For instance, CPU 16 may define the x, y, z coordinates for vertices of plurality of primitives of the 3D mesh model. GPU 18 may overlay a first texture (e.g., one of FIG. 2A or 2B) onto a first 3D mesh model to generate a first portion of image content (e.g., a first sub-capsule of image content). GPU 18 may repeat this procedure but with a second texture (e.g., other one of FIG. 2A or 2B) onto a second 3D mesh model to generate a second portion of the image content (e.g., a second sub-capsule of image content). The first and second 3D mesh models may be the same 3D mesh model but used for rendering different portions of the sphere of image content.

To overlay the color textures, CPU 16 may define texture coordinates for the image pixels within circular images. The image pixels are generally normalized to be between 0 and 1. One example manner in which CPU 16 may define the texture coordinates is based on polar coordinates. For instance, the texture map may include a plurality of texture primitives that form concentric rings. One example of the texture coordinates is the coordinates of the vertices of the texture primitives. In some examples, the coordinates of the vertices of the texture primitives may be defined in polar coordinates instead of Cartesian coordinates, but the example techniques are not so limited.

In essence, the texture map having the plurality of texture primitives that form concentric rings can be considered as dividing up the circular images into a plurality of primitives in concentric rings. For instance, the coordinates of the vertices of the texture primitives can be used to refer to coordinates of pixels in the circular images. In other words, CPU 16 divides the circular image into a plurality of primitives, where the size and shape of a primitive is defined by the texture map, which in this case, means that CPU 16 divides the circular image into a plurality of primitives that form concentric rings. An example of such a texture map and ways in which the texture map is generated is described with respect to FIGS. 5, 7, 8, and 9.

The 3D mesh model (e.g., sub-capsule), which forms the geometry on which the color texture is overlaid, includes a set of vertex coordinates for the plurality of primitives that form the 3D mesh model. The circular image generated from one of lens 12A or 12B (e.g., one of FIG. 2A or 2B), which forms the color texture that is overlaid on the geometry, includes a set of texture coordinates.

As an example, GPU 18 may overlay texture primitives onto the primitives of the 3D mesh model on a primitive-by-primitive basis. The texture primitives and the primitives of the 3D mesh model may be quadrilaterals, as a non-limiting example. CPU 16 may output instructions to GPU 18 that correspond the four texture coordinates vertices of a texture primitive to the four vertex coordinates of a primitive of the 3D mesh model. CPU 16 may also output instructions that cause GPU 18 to overlay (e.g., glue) the texture primitive onto the primitive of the 3D mesh model. CPU 16 and GPU 18 may repeat these operations on a primitive-by-primitive basis for all primitives in the 3D mesh model.

The result of this texture mapping operation is a first portion (e.g., first sub-capsule) of a sphere of image content. For example, if CPU 16 and GPU 18 started with the circular image of FIG. 2A, then the result would be a sub-capsule on which the circular image of FIG. 2A is overlaid, forming a first portion of the entire viewable content. CPU 16 and GPU 18 may repeat these operations on the second circular image (e.g., the circular image of FIG. 2B) to generate a second portion (e.g., second sub-capsule) of the sphere of image content. These portions, which are 3D portions, include the entire image content that forms the sphere of image content (e.g., the 360-degrees of viewable content).

As described above, in some examples, the image content along the circumference of the circular images generated from image content captured by lens 12A and 12B appears compressed. In some examples, CPU 16 and GPU 18 may utilize the texture mapping to stretch out the compressed image content.

The width of the texture primitives in the concentric rings may be variable. For example, the width of the texture primitives in one or more of the outer rings may be less than the width of the texture primitives in the other rings. As one example, the width of the texture primitives in the outer most ring may be less than the width of all other rings. The width of the next to most outer ring may be less than the width of all other rings except the outer most ring, and so forth. In some examples, the width of primitives in most of the rings may be the same except for just the outer most ring or the last few outer rings.

The difference in the widths of the texture primitives results in different amounts of stretching when mapped to the corresponding primitives in the 3D mesh model. As described above, the texture primitive refers to a group of image pixels in a circular image that encompass the area formed by the texture coordinates of the texture primitive. For example, assume that a size and shape of a texture primitive is the same as a size and shape of a corresponding primitive on the 3D mesh model. This assumption need not necessarily be true, and is provided to assist with understanding. In this case, when GPU 18 texture maps the texture primitive to the corresponding primitive on the 3D mesh model, the mapping is one-to-one (e.g., GPU 18 can directly overlay the texture primitive on-top of the corresponding primitive of the 3D mesh model.

In another example, assume that a size and shape of a texture primitive is less than a size and shape of a corresponding primitive on the 3D mesh model. In particular, assume that the width of the texture primitive is less than the width of the corresponding primitive on the 3D mesh model. For instance, if the texture primitive and the primitive in the 3D mesh model were both rectangles, then the width of the texture primitive would be less than the width of the primitive in the 3D mesh model, and the length may be the same. In this case, when GPU 18 texture maps the texture primitive to the corresponding primitive on the 3D mesh mode, the mapping is not one-to-one. Rather, GPU 18 stretches out the texture primitive width-wise to overlay the texture primitive on-top-of the corresponding primitive in the 3D mesh model. As an example, if the width of the texture primitive were half the width of the primitive of the 3D mesh model, then the image content in the texture primitive would stretch by a factor of two so that the image content is overlaid on the primitive in the 3D mesh model.

In examples described in this disclosure, the texture primitives in one or more outer rings of the texture map correspond to image content along the circumference of the circular images (e.g., along the circumference of the images illustrated as FIGS. 2A and 2B). Also, as noted above, the image content along the circumference of the circular images tends to be compressed. Therefore, because the width of the texture primitives in one or more of the outer rings is less than the width of the other texture primitives, when GPU 18 overlays the image content from the circular images onto the corresponding primitives of the 3D mesh model, there may be more stretching of the image content along the circumference of the circular images than for other image content in the circular images.

In this way, CPU 16 and GPU 18 may utilize texture mapping techniques to compensate for the image content compression that occurs when lenses 12A and 12B capture image content and camera processor 14 generates the circular images. Such techniques for compensating image content compression are not necessary in all examples. For instance, CPU 16 may define a texture map with equal widths or adjust the primitives of the 3D mesh model so that there is not stretching.

GPU 18 performs the texture mapping to overlay a first circular image (e.g., circular image illustrated in FIG. 2A) onto a first 3D mesh model to generate a first portion of image content, and performs the texture mapping to overlay a second circular image (e.g., circular image illustrated in FIG. 2B) onto a second 3D mesh model to generate a second portion of the image content. The first and second 3D mesh models may be instances of the same 3D mesh model, or may be different 3D mesh models.

GPU 18 may also blend the first and second portions, and there may be various ways in which GPU 18 may blend the first and second portions. As one example, GPU 18 may blend the first and second portions based on the overlapping portion in the first and second portions. As described above, the image content in each of the first and second portions is more than 180-degrees of image content, meaning that there is some overlapping image content (e.g., image content that appears in both) the first and second portions.

This overlapping content occurs along the seams of the first and second portions (e.g., along with widest area of the first and second sub-capsules). GPU 18 may blend the overlapping portions so that the same image content does not appear twice in the final sphere of image content.

For example, GPU 18 may also perform alpha blending along the overlapping portions of the two portions. Alpha blending is a way to assign weighting that indicates the percentage of video content used from each of the portions when blending. For instance, assume there is a first portion and a second portion, where the first portion is to the left of the second portion. In this example, most of the image content of the first portion that is further away from the overlapping seam is used and little of the image content of the second portion is used in blending. Similarly, most of the image content of the second portion that is further away from the overlapping seam is used and little of the image content of the first portion is used in blending. Moving from left-to-right, more and more of the image content from the second portion and less of the image content from the first portion is used in blending. Accordingly, the alpha blending weighs contributions of image content from the first and second portions of the image content.

For instance, with alpha blending in the overlapping area, there is a weighted contribution of overlapping pixels. If on the left of the overlapping seam, but still overlapping, GPU 18 weights the pixels on left sphere more than those on the right sphere (e.g., more weight to pixels on left sphere than right sphere). If on the right of the overlapping seam, but still overlapping, GPU 18 weights the pixels on right sphere more than those on the left sphere (e.g., more weight to pixels on the right sphere than left sphere). The weighting for the blending changes progressively through the overlapping seam.

To perform the alpha blending, GPU 18 may perform another texturing pass to generate a mask texture. GPU 18 may use this mask texture with the color texture to generate the sphere of video content for the 360-degree video.

For example, CPU 16 may define a mask texture. The primitives that form the mask texture may be the same size and shape as the primitives that form color texture. In other words, the mask texture map may be the same as the color texture map used to define the texture coordinates for the pixels in the circular images. However, the values of the mask texture map may indicate the weighting used in the blending of the first and second portions. Unlike the color textures (e.g., the circular images), the mask texture is not an actual image with image content. Rather, the mask texture is a way to define the opacity of pixels within the portions (e.g., sub-capsules).

The mask texture map may be conceptually considered as being a gray-scale image with values ranging from 0 to 1, where 1 represents that 100% of the sub-capsule is used in the blending, and 0 represents that 0% of the sub-capsule is used in the blending. If the value in the mask texture map is between 0 and 1, then that value indicates the weighting applied to corresponding pixel in the sub-capsule, and the remainder weighting is applied to corresponding pixel in the other sub-capsule (e.g., blending between the two sub-capsules).

For instance, assume that value in the mask texture map when applied to the first sub-capsule is 0.4. This means that GPU 18 weights a pixel on the first sub-capsule by 40%, and weights a corresponding pixel on the second sub-capsule by 60%.

Because the overlapping in the first and second portions occurs along the seam where the first and second sub-capsules couple to one another, the mask texture that CPU 16 generates may indicate a weighting of "one" for the values in the center of the mask texture. This is because mask texture primitives in the center of the mask texture correspond to locations on the first and second sub-capsules where there is no overlap. In the mask texture map, for the values in the mask texture map that correspond to locations on the first and second sub-capsules where there is overlap, the values may be less than "one" and greater than "zero." For instance, for values closer and closer to circumference of the mask texture, the values may become smaller and smaller, until the values reach "zero."

In one or more examples, CPU 16 and GPU 18 may utilize three different textures for rendering the circular images generated by the image content captured by fisheye lenses 12A and 12B. In a first pass, a first texture is a first color texture, which is one of the circular images. GPU 18 performs texture mapping using the first color texture to overlay a first circular image onto a first 3D mesh model, defined by CPU 16. An example shape of the first 3D mesh model is a sub-capsule, but other shapes are possible. In a second pass, a second texture is a second color texture, which is the other one of the circular images. GPU 18 performs texture mapping using the second color texture to overlay a second circular image onto a second 3D mesh model, defined by CPU 16. An example shape of the second 3D mesh model is a sub-capsule, but other shapes are possible. The first and second 3D mesh models may be instances of the same mesh model or different mesh models. In some examples, a width of a first ring in the first and second 3D mesh models is less than a width of a second ring in the first and second 3D mesh models, respectively.

As described above, during the texture mapping, GPU 18 may stretch portions of the image content that were compressed in the circular images generated from the image content captured by lenses 12A and 12B.

GPU 18 may assign blending factors to the first and second portions of the image content. For example, GPU 18 performs a third pass of texture mapping using a mask texture. This mask texture is not an image itself but rather is a mechanism to define the blending factors (e.g., weighting applied to pixels in the first and second portions as part of the blending). During this third pass, where GPU 18 is using values from the texture map, GPU 18 may be assigning the opacity to each of the pixels in the first and second portions. The opacity may define how to blend the overlapping portions of the first and second portion (e.g., how much each of the first and second portions contributes to the final sphere of image content). A blender circuit of GPU 18 may then blend the first and second portions to generate a sphere of image content.

For example, GPU 18 performs texture mapping to overlay a first circular image on a 3D mesh model to generate a first portion of image content, and performs texture mapping using a mask texture on the first portion of image content. GPU 18 may render the first portion to generate a rendered first portion that GPU 18 stores in system memory 30 or local memory 20. GPU 18 repeats similar operations to generate a rendered second portion that GPU 18 stores in system memory 30 or local memory 20. GPU 18 may then retrieve the first and second portions, or at least sub-portions of the first and second portions, and use its blender circuit to blend the first and second portions to generate the sphere of image content.

GPU 18 may output the result of the rendering and blending to system memory 30. Display interface 26 may retrieve the image content from system memory 30 and display the resulting image content on display 28. In some examples, display 28 may display a portion of the entire sphere, and the viewer may interface with computing device 10 (e.g., via display 28) to select which portion of the sphere to view.

In some examples, prior to blending, a seam may appear where the first and second portions are coupled together. The seam may manifest as a sudden change in image content or a misalignment in image content. For example, if the first and second portions are not aligned, then even with blending there may be sudden change in image content. GPU 18 may detect such a seam and perform further processing to correct for the seam, and in some examples, perform such processing prior to blending.

One example way to detect a seam is to compare similarity in the overlapping areas. For example, assume that overlapping portions in the first and second portions are N×M pixels. Processing circuitry of GPU 18, such as arithmetic logic units (ALUs) or elementary function units (EFUs) may subtract the color values of the N×M pixels from the first and second portions. The processing circuitry may determine the similarity based on the subtraction of the color values.

In some examples, GPU 18 may implement a Maximum of Absolute Differences technique to determine similarity in overlapping image content. For instance, the processing circuitry of GPU 18 may subtract the color values of the N×M pixels from the first and second portions. The processing circuitry may determine an absolute value of the results from the subtraction, and may determine a maximum value from the absolute values. Having a maximum value closer to 0 indicates that there is high similarity between the overlapping image content of the first and second portions. If the maximum value is less than a threshold value (e.g., pre-stored or determined threshold value), GPU 18 may determine that there is proper alignment in the first and second portions (e.g., there is similarity between the overlapping image content).

If, however, there is not similarity between the overlapping image content, CPU 16 and GPU 18 may repeat the process of generating a portion of image content but with adjusted texture coordinates. For example, CPU 16 may utilize a different texture map to determine coordinates for the color texture. This different texture map may be similar to the original texture map except the texture primitives may be warped or shifted, or a portion of the texture primitives may be changed. GPU 18 may map one of the first or second circular images using the texture coordinates from this different texture map onto the 3D mesh model, and GPU 18 may render the resulting portion of the image content. GPU 18 may determine similarity between this resulting portion and the other portion to determine whether or not there is similarity between their overlapping image content. CPU 16 and GPU 18 may repeat these operations until the similarity between the overlapping image content is greater than the threshold value.

CPU 16 may adjust texture coordinates of the texture primitives used to generate the first and second portions by either selecting a different texture map or may adjust texture coordinates by calculating on the fly the new texture coordinates. For example, CPU 16 may change the angle of the primitives in the texture map to adjust the texture coordinates, and determine the texture coordinates for these adjusted primitives.

There may be other ways in which to determine the similarity between overlapping image content in the first and second portions, and the above is one example way to determine the similarity. Also, the above provides one example for how to adjust the texture coordinates of the texture primitives in the color texture, and other ways to adjust the texture coordinates of the texture primitives in the color texture are possible.

FIG. 4 is a block diagram illustrating CPU 16, GPU 18 and memory 30 of computing device 10 of FIG. 3 in further detail. As shown in FIG. 4, CPU 16 is communicatively coupled to GPU 18 and memory 30, and GPU 18 is communicatively coupled to CPU 16 and memory 30. GPU 18 may, in some examples, be integrated onto a motherboard with CPU 16. In additional examples, GPU 18 may be implemented on a graphics card that is installed in a port of a motherboard that includes CPU 16. In further examples, GPU 18 may be incorporated within a peripheral device that is configured to interoperate with CPU 16. In additional examples, GPU 18 may be located on the same microchip as CPU 16 forming a system on a chip (SoC).

CPU 16 is configured to execute application 34, a graphics API 36, and a GPU driver 38, and an operating system 39. GPU 18 includes a controller 40, shader core 42, and one or more fixed-function units 44.

Software application 34 may include at least some of one or more instructions that cause graphic content to be displayed or one or more instructions that cause a non-graphics task (e.g., a general-purpose computing task) to be performed on GPU 18. As an example, software application 34 may be cause CPU 16 to cause camera processor 14 and lenses 12A and 12B to capture 360-degree video or images, and cause GPU 18 to render the 360-degree video or images for display. Software application 34 may issue instructions to graphics API 36. Graphics API 36 may be a runtime service that translates the instructions received from software application 34 into a format that is consumable by GPU driver 38. In some examples, graphics API 36 and GPU driver 38 may be part of the same software service.

GPU driver 38 receives the instructions from software application 34, via graphics API 36, and controls the operation of GPU 18 to service the instructions. For example, GPU driver 38 may formulate one or more command streams, place the command streams into memory 30, and instruct GPU 18 to execute command streams. GPU driver 38 may place the command streams into memory 30 and communicate with GPU 18 via operating system 39 (e.g., via one or more system calls).

Controller 40 of GPU 18 is configured to retrieve the commands stored in the command streams, and dispatch the commands for execution on shader core 42 and one or more fixed-function units 44. Controller 40 may dispatch commands from a command stream for execution on one or more fixed-function units 44 or a subset of shader core 42 and one or more fixed-function units 44. Controller 40 may be hardware, fixed-function circuitry of GPU 18, may be programmable circuitry of GPU 18 for executing software or firmware, or a combination of both.

Shader core 42 includes programmable circuitry (e.g., processing cores on which software executes). One or more fixed-function units 44 include fixed function circuitry configured to perform limited operations with minimal functional flexibility. Shader core 42 and one or more fixed-function units 44 together form a graphics pipeline configured to perform graphics processing.

Shader core 42 may be configured to execute one or more shader programs that are downloaded onto GPU 18 from CPU 16. A shader program, in some examples, may be a compiled version of a program written in a high-level shading language (e.g., an OpenGL Shading Language (GLSL), a High Level Shading Language (HLSL), a C for Graphics (Cg) shading language, etc.). In some examples, shader core 42 may include a plurality of processing units that are configured to operate in parallel (e.g., a SIMD pipeline). Shader core 42 may have a program memory that stores shader program instructions and an execution state register (e.g., a program counter register) that indicates the current instruction in the program memory being executed or the next instruction to be fetched. Examples of shader programs that execute on shader core 42 include, for example, vertex shaders, pixel shaders (also referred to as fragment shaders), geometry shaders, hull shaders, domain shaders, compute shaders, and/or unified shaders.

Fixed-function units 44 may include hardware that is hard-wired to perform certain functions. Although the fixed function hardware may be configurable, via one or more control signals, for example, to perform different functions, the fixed function hardware typically does not include a program memory that is capable of receiving user-compiled programs. In some examples, one or more fixed-function units 44 may include, for example, processing units that perform raster operations (e.g., depth testing, scissors testing, alpha blending, etc.).

GPU driver 38 of CPU 16 may be configured to write the command streams to memory 30, and controller 40 of GPU 18 may be configured to read the one or more commands of command streams from memory 30. In some examples, one or both of command streams may be stored as a ring buffer in memory 30. A ring buffer may be a buffer with a circular addressing scheme where CPU 16 and GPU 18 maintain synchronized state variables associated with the writing of data to and reading of data from the ring buffer. For example, if the first command stream is a ring buffer, each of CPU 16 and GPU 18 may store a write pointer indicating the next address to be written to in the ring buffer, and a read pointer indicating the next address to be read from in the ring buffer.

When CPU 16 writes a new command to the ring buffer, CPU 16 may update the write pointer in CPU 16 and instruct GPU 18 to update the write pointer in GPU 18. Similarly, when GPU 18 reads a new command from the ring buffer, GPU 18 may update the read pointer in GPU 18 and instruct CPU 16 to update the read pointer in CPU 16. Other synchronization mechanisms are possible. When the read and/or write pointers reach a highest address in the range of addresses allocated for the ring buffer, the read and/or write pointers may wrap around to the lowest address to implement a circular addressing scheme.

Example operation of an example GPU driver 38 and an example GPU controller 40 is now described with respect to FIG. 4. GPU driver 38 receives one or more instructions from software application 34 that specify graphics operations and/or general-purpose computing operations to be performed by GPU 18. GPU driver 38 places the output command stream into memory 30, which is accessible by GPU controller 40. GPU driver 38 notifies GPU controller 40 that the command stream corresponding to software application 34 is available for processing. For example, GPU driver 38 may write to a GPU register (e.g., a GPU hardware register polled by GPU 18 and/or a GPU memory-mapped register polled by GPU 18) one or more values indicating that the command stream is ready for execution.

Upon notification that the command stream is ready for execution, controller 40 of GPU 18 may determine if resources are currently available on GPU 18 to begin executing the command stream. If resources are available, controller 40 begins to dispatch the commands in the command stream.

As part of graphics processing, CPU 16 may offload certain graphics processing tasks to GPU 18. For instance, application 34 may generate attribute data for attributes of a plurality of vertices of primitives that interconnect to form a graphical object. Application 34 may store the attribute data in a vertex buffer in memory 30 (e.g., vertex coordinates buffer 46). GPU driver 38 may instruct controller 40 to retrieve the attribute data for the attributes of the vertices for processing to generate graphics data for display.

As an example operation, application 34 may cause lenses 12A and 12B to capture image content, and cause camera processor 14 to generate and store first circular image 48 and second circular image 50 in memory 30. Application 34, via graphics API 36 and GPU driver 38, may generate a command stream instructing GPU 18 to perform the example techniques described in this disclosure.

For example, application 34 may generate a 3D mesh model, and store the vertex coordinates of the primitives of the 3D mesh model in vertex coordinates buffer 46 in memory 30. In some examples, vertex coordinates for the primitives of the 3D mesh model may be pre-stored in vertex coordinates buffer 46. One example way to generate the vertex coordinates is described below. Similarly, application 34 may define and store the texture coordinates for a color texture map in texture coordinates buffer 52, or the texture coordinates for the color texture map may be pre-stored in texture coordinates buffer 52. One example way to generate the texture coordinates is described below.

To perform texture mapping, CPU 16 may indicate to GPU 18 which texture coordinates correspond to which vertex coordinates of the 3D mesh model. One example way to indicate such correspondence is through the vertex shader that is to execute on the circuitry of shader core 42. The function of a vertex shader is to perform processing on vertices of the 3D mesh model. To perform such processing, application 34, via graphics API 36 and GPU driver 38, instructs controller 40 to retrieve batches of vertex coordinates (e.g., vertex coordinates for a primitive of the 3D mesh model) from vertex coordinates buffer 46. In addition, application 34, via graphics API 36 and GPU driver 38, may instruct controller 40 to retrieve texture coordinates from texture coordinates buffer 52 that correspond to the vertex coordinates retrieved from vertex coordinates buffer 46.

Controller 40 may provide the x, y, z coordinates of the vertex coordinates for a primitive of the 3D mesh model and the s, t coordinates of the texture coordinates for a corresponding color texture primitive to the vertex buffer as input for processing. In addition, application 34, via graphics API 36 and GPU driver 38, instructs a texture hardware circuit, which is an example of fixed-function units 44, to retrieve a texture primitive located at the texture coordinates within first circular image 48 and store the texture primitive in local memory 20 (local memory 20 is illustrated in FIG. 3).

Application 34, via graphics API 36 and GPU driver 38, may issue commands to the texture hardware circuit instructing the texture hardware circuit to overlay the texture primitive onto the 3D mesh model primitive. Texture hardware circuit may stretch or otherwise resize, as instructed by application 34, the texture primitive so that texture primitive fits within the primitive of the 3D mesh model (e.g., via interpolation, filtering, and other mathematical operations to scale the texture primitive). The texture hardware circuit may assign the vertex attributes (e.g., color and opacity values) to the vertices of the 3D mesh model based on the vertex attributes of the texture primitives.

Fixed-function units 44 of GPU 18 may rasterize the output from the vertex shader, and output the rasterized primitive to a pixel shader. Application 34, via graphics API 36 and GPU driver 38, may cause controller 40 of GPU 18 to execute the pixel shader (also called fragment shader) on the circuitry of shader core 42. The pixel shader may assign the pixel values from the texture primitive to the corresponding pixels in the rasterized primitive to render image content.

CPU 16 and GPU 18 may repeat these steps for all of the primitives of the 3D mesh model and the color texture primitives using first circular image 48 to generate a first rendered portion of image content. CPU 16 and GPU 18 may repeat these steps, but with second circular image 50 forming the color texture to generate a second rendered portion of image content.

Application 34, via graphics API and GPU driver 38, may then instruct controller 40 to cause fixed-function units 44 to alpha blend the first and second rendered portions. For example, application 34 may generate mask texture 54 and store mask texture 54 in memory 30, or mask texture 54 may be pre-generated and stored in memory 30. Mask texture 54 may include values that are used to indicate the opacity of pixels in the first and second portions.

Controller 40 may receive instructions from application 34 to use mask texture 54 as part of another pass of texture mapping where mask texture 54 forms a texture that the texture hardware circuit of GPU 18 maps to the first and second portions. In some examples, application 34 may use the same texture coordinates stored in texture coordinates buffer 52 used for texture mapping first circular image 48 and second circular image 50. For example, shader core 42 may execute a vertex shader with the vertex coordinates of the first and second portions as inputs along with corresponding coordinates for mask texture 54, and the texture hardware circuit of GPU 18 may perform texture mapping as described above.

One possible advantage of using the texture coordinates stored in texture coordinates buffer 52 for the texture coordinates for first circular image 48 and second circular image 50 and for mask texture 54 is that texture mapping may be very precise. Mask texture 54 indicates the opacity. By using the texture coordinates of texture coordinates buffer 52, the correct opacity value will be assigned to the correct pixel in the first and second portions. In this way, a very precise mask may be generated by rendering a color per vertex leveraging texture hardware circuit of GPU 18.

In some examples, only one mask texture 54 may be needed. For example, the texture hardware circuit of GPU 18 may use mask texture 54 for assigning the opacity values to the first portion, and use mask texture 54 for assign the opacity value to the second portion. For example, the values of mask texture 54 may be 0.0 (for black or transparent) to 1.0 (for white or opaque), with the middle being 0.5. The mask texture value is referred to as alpha. GPU 18 may texture map mask texture 54 to one of the first portion or the second portion, and for the other one, the mask texture value may be 1-alpha. For instance, as described above, if mask texture 54 defines the alpha value as 0.4 for a pixel in the first portion, then the alpha value applied to the pixel in the second portion is 0.6.

After assigning the opacity values, fixed-function units 44 may blend the two portions disabling depth culling, and using alpha blending. The result of the rendering is the 360-degree image that is displayed by display 28.

For example, part of the rendering of the first portion and the second portion is converting the 3D coordinates of the pixels of the first portion and the second portion into 2D coordinates of pixels on display 28. For example, the rendered first portion and the rendered second portion are both images with pixels being defined in two dimensions. In some cases, the rendered first portion and rendered second portion may be individually displayable, but their display would not appear to be 360-video/image until the first rendered portion and second rendered portion are stitched together.

One way to stitch the first rendered portion and the second rendered portion is by alpha blending across the overlapping portion. For example, because there is overlapping image content in the first rendered portion and the second rendered portion, there are a plurality of pixels in the first rendered portion having the same <x,y> coordinates as pixels in the second rendered portion (e.g., there are overlapping pixels in each of the first and second reference portions). Also, each of the pixels in the first rendered portion and the second rendered portion are assigned an opacity value (also called alpha value) as part of the texture mapping based on mask texture 54.

The blender circuit of fixed-function units 44 may utilize the opacity value for alpha blending. For example, the opacity value may indicate the percentage that a pixel contributes to the final sphere of image content. The blender circuit may scale the pixel values based on the opacity (or alpha) values for the first portion and the second portion, and assign a new value based on the scaling of the pixel values to the pixels in the overlapping portion. GPU 18 may output these new pixel values for the pixels in the overlapping portion as the pixel values for the sphere of image content.

For example, for the pixels in the first and second portions that do not overlap, their respective opacity values will indicate to the blender circuit that no blending is needed (e.g., all contribution from one of the first or second portion and no contribution from the other portion). For pixels in the first and second portions that do overlap, their respective opacity values indicate respective contribution of pixels to the final image content. Accordingly, GPU 18 may generate a sphere of image content at least in part by blending, via the blender circuit, the first rendered portion and the second rendered portion based on the overlapping image content.

As an example, assume that the first portion is referred to as A with pixels having ColorA, and the second portion is referred to as B with pixels having ColorB. The formula for the alpha blending may be ColorFinal=(Ca*AlphaA+Cb*AlphaB(1−AlphaA))/(AlphaA+AlphaB(1−AlphaA)), where ColorFinal is the result of the operation, Ca is the color of the pixel in the first portion, Cb is the color of the pixel in the second portion, AlphaA and AlphaB are the alpha of pixels in respective ones of the first and second portions. If it is assumed that all color values are premultiplied by their alpha values, ColorFinal=ColorA+ColorB*(1−AlphaA). In this example, GPU 18 may be considered as performing A over B compositing, and not necessarily in, out, atop, and xor compositing, although such additional compositing may be possible.

Figure 5:
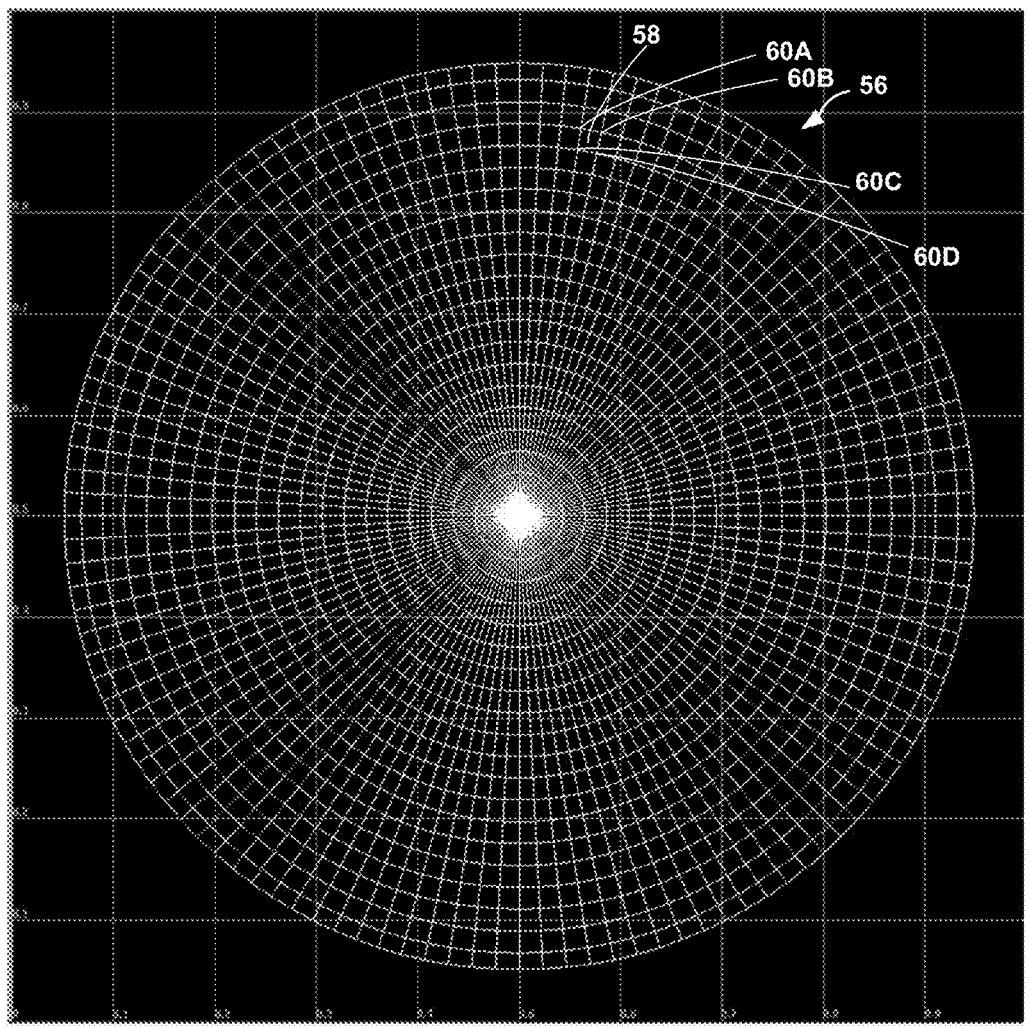
FIG. 5 is a conceptual diagram illustrating an example of two-dimensional (2D) texture coordinates.

FIG. 5 is a conceptual diagram illustrating an example of two-dimensional (2D) texture coordinates. For instance, FIG. 5 illustrates one example of texture map 56 having texture primitives with texture coordinates stored in texture coordinates buffer 52. The texture coordinates may be configured in the pattern illustrated in FIG. 5 (e.g., as blocks of concentric rings in texture map 56). The number of concentric rings in texture map 56, and the size of the primitives in may be pre-defined or defined during operation. Also, the primitives are illustrated as being square-like, but the examples are not limited to such primitives.

For example, FIG. 5 illustrates texture primitive 58, as an illustrative example to assist with understanding. Texture primitive 58 is a quadrilateral, and in this example, square-like. Texture primitive includes four vertices: vertex 60A-60D. Texture coordinates buffer 52 may store the vertex coordinates for vertex 60A-60D for texture primitive 58. Texture coordinates buffer 52 may similarly store vertex coordinates for other primitives, like primitive 58, of texture map 56. In this example, because texture map 56 includes a plurality of concentric circles, the vertex coordinates for vertex 60A-60D of primitive 58 may be defined in polar coordinates.

In some examples, in addition to providing first circular image 48 and second circular image 50, camera processor 14 may output information indicating camera image parameters of lenses 12A and 12B. For example, the camera image parameters may indicate the amount of image content captured by lenses 12A and 12B (e.g., 200-degrees of image content). CPU 16 may utilize the camera image parameters to determine the illustrated texture map 56 (e.g., the positions of vertex 60A-60D, and all other vertices of texture map 56). As an example, memory 30 or a local memory of CPU 16 may store a look-up table that indicates how much image content is captured for different types of lenses and size of images. For example, the look-up table includes lens type information and degrees of image content and size of images captured for each lens type. CPU 16 may compare the information indicating the camera image parameters with information indicating degrees of image content captured and size of images.

Access to the camera image parameters is not necessary in every example. In examples where access to the camera image parameters is not available, CPU 16 may utilize a default texture map 56. Accordingly, the techniques described in this disclosure should not be considered limited to examples where camera image parameters are used.

In some examples, rather than CPU 16 dynamically determining texture map 56 (e.g., such as where all of camera image parameters are not available), various different texture maps may be pre-generated and pre-stored in memory 30. For example, via trial-and-error process to determine which texture maps result in desirable image quality for different lens types, a user may store different texture maps in memory 30 associated with the different lens types in a look-up table. CPU 16 may utilize this look-up table to determine which texture map to use. In some examples, no camera image parameters may be available, and for such cases, CPU 16 may utilize a default look-up table.

In this disclosure, the generation of texture map 56 may be controlled by application 34 or some other application executing on CPU 16. For instance, operating system 39 may execute an application that determines texture map 56 in response to a user executing application 34. The other application may then provide information to application 34 indicating which texture map is to be used. As another example, this other application may provide the texture coordinates as inputs to application 34, and in turn, application 34 includes the texture coordinates as inputs to the instructions that the vertex shader is to execute.

Figure 6:
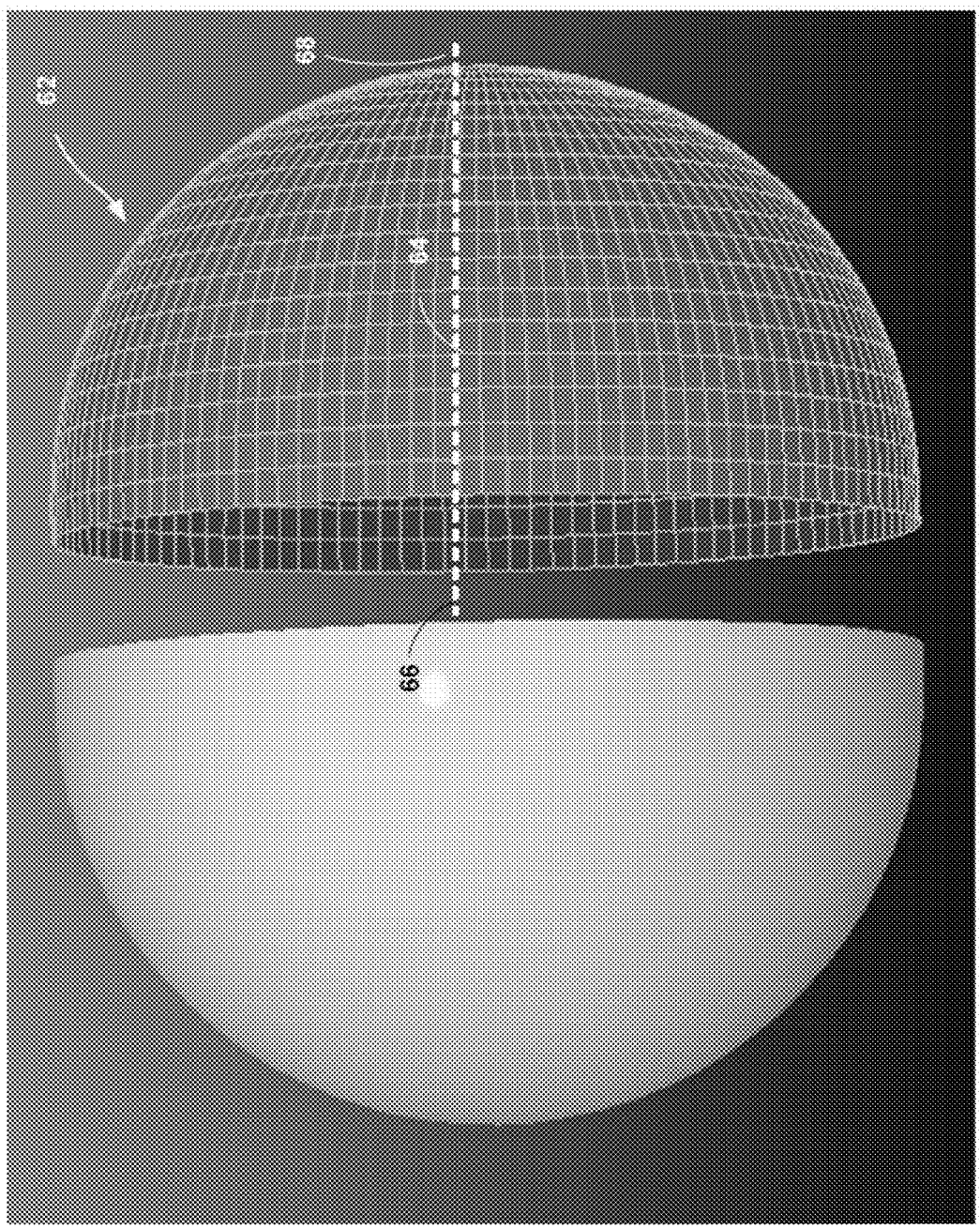
FIG. 6 is a conceptual diagram illustrating a three-dimensional (3D) geometry.

FIG. 6 is a conceptual diagram illustrating a three-dimensional (3D) geometry. For example, FIG. 6 illustrates an example of the 3D mesh model 62. 3D mesh model 62 has a shape of a sub-capsule (e.g., generally that of a circle on one end and a tip on the other end). In example techniques, CPU 16 uses polar coordinates to generate coordinates for the 3D mesh model 62. The vertex XYZ positions may be configured in the pattern illustrated in FIG. 6, and calculated using spherical coordinates. For example, 3D mesh model 62 includes longitudinal axis 64 that extends from a center point 66 of one end of the sub-capsule shape of 3D mesh model 62 to a tip 68 of the sub-capsule shape of 3D mesh model 62. The plurality of primitives of the plurality of rings of 3D mesh model 62 are disposed around the sub-capsule shape of 3D mesh model 62 (e.g., the rectangular primitives form rings around 3D mesh model 62). In some examples, a width of a first ring of 3D mesh model 62 may be less than a width of a second ring of 3D mesh model 62.

Figure 7:
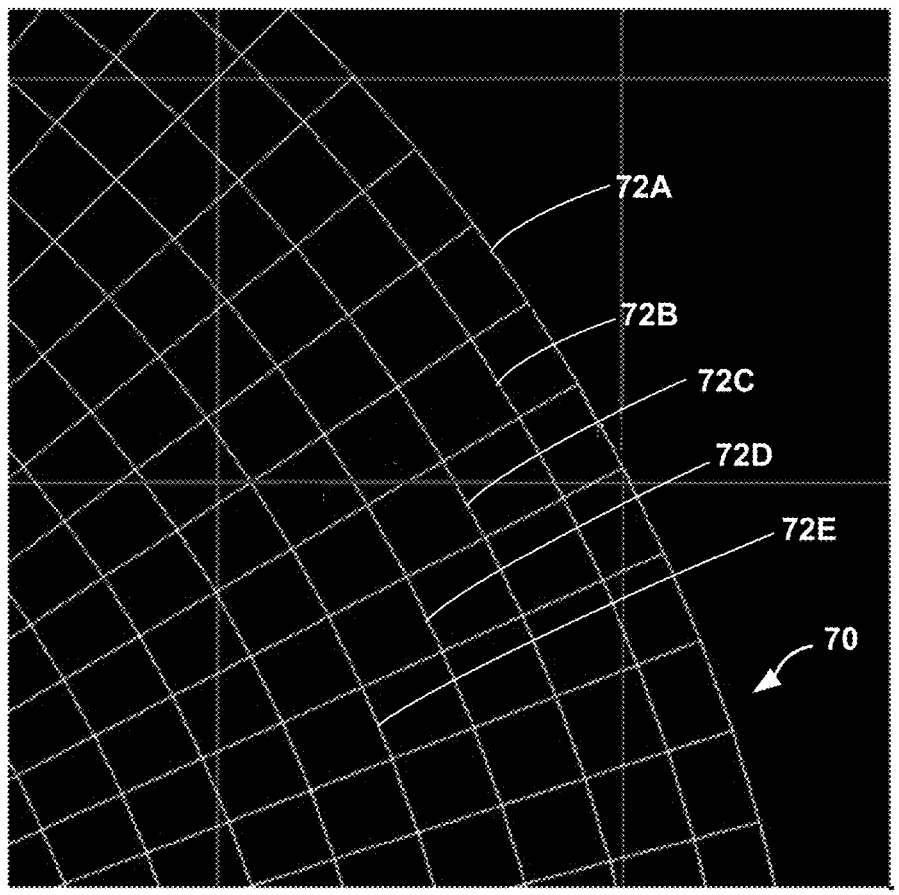
FIG. 7 is a conceptual diagram illustrating zoomed in 2D texture coordinates including a last ring of the 2D texture coordinates.

FIG. 7 is a conceptual diagram illustrating a zoomed in view 70 of 2D texture map 56 of FIG. 5. In particular, FIG. 7 illustrates concentric rings 72A-72E of FIG. 5. There are more concentric rings in texture map 56 than concentric rings 72A-72E, and in some examples, there may be fewer concentric rings. Therefore, the discussion of concentric rings 72A-72E is provided for purposes of discussion only.

In the example illustrate in FIG. 7, the last "ring" of texture map 56, as illustrated in zoomed in view 70, is ring 72A. In the illustrated example, the width of ring 72A is less than the width of rings 72B-72E. Rings 72A-72E include a plurality of texture primitives (similar to primitive 58) arranged in a circle, and a plurality of rings may be ordered concentrically. The texture coordinates may be the vertices (like vertex 60A-60D) of these rings.

In some examples, each one of rings 72A-72E (e.g., all of the rings of texture map 56) include rings having the same width. However, as noted above, in some examples, ring 72A has a shorter width relative to the other rings.

All rings 72A-72E except the last ring 72A do not have to be same length, and in some examples, it is possible for the last ring 72A to not necessarily be less wide than all other rings 72B-72E. For example, one of rings 72B-72D in the example of FIG. 7 may be the least wide ring instead of ring 72A. Ring 72A may be kept at a relatively small width. However, keeping ring 72A at a relatively small width may not be necessary in all examples. Also, one or more of the last rings (e.g., outer rings) may be smaller than earlier lengths (e.g., 72A is smaller than 72B-72E; 72B is smaller than 72C-72E; 72C is smaller than 72D and 72E, and so forth).

Figure 8:
FIG. 8 is a pictorial diagram illustrating image content.

FIG. 8 is a pictorial diagram illustrating image content 74. Image content 74 is part of a circular image that one of fisheye lens 12A or 12B would generate. For example, image content 74 is a zoomed in version of the circular image that one of fisheye lens 12A or 12B would generate. As described above, at the edges of the circular image appear to be compressed relative to other parts of the circular image. For instance, compression portion 76 includes content of image content 74 that appears more compressed relative to other portions of image content 74. The example techniques described in this disclosure account for compression portion 76. For instance, as part of the texture mapping, GPU 18 stretches compression portion 76 to that the image content is no longer compressed.

In the example illustrated in FIG. 7, a given camera lens field of view of 200 degrees may be shortened to be 23% shorter than others (e.g., the width of ring 72A is 23% less than the width of ring 72B-72E). The 3D positions of these points (e.g., image pixels that correspond to the texture) retain their 3D spacing, and may not be compressed. This causes stretching of compressed areas, compensating for compression portion 76.

For example, in the images captured by lenses 12A and 12B, the edges of the images appear compressed (e.g., as illustrated by compression portion 76). In the 360-degree video, the compressed image content may negatively impact viewer experience. By reducing the size of the outer rings, the number of pixels in outer rings is reduced relative to the other rings. However, the positions of these points that fall within the rings having the reduced size retain their spacing. When these points are rendered, the rendering causes the points to stretch out and overcome the compression that occurs from the way the image is captured.

Figure 9:
FIG. 9 is a pictorial diagram illustrating a relationship between texture coordinates and image pixels.

FIG. 9 is a pictorial diagram illustrating a relationship between texture coordinates and image pixels. For instance, FIG. 9 illustrates image portion 74 of FIG. 8 with texture coordinates of texture map 56 on-top-of image portion 74. As described above, the texture coordinates (e.g., texture coordinates of vertex 60A-60D) define texture primitives, where the texture primitives are primitives of the circular image. Image portion 74 of FIG. 9 may be considered as illustrating one of first circular image 48 or second circular image 50, and the texture primitives formed by texture map 56 on-top-of image portion 74 are the texture primitives that texture hardware circuit of GPU 18 overlays on the 3D mesh model to generate a first portion or a second portion of the sphere of image content.

In FIGS. 5-9, for the vertex positions, the mesh model (e.g., the meshes shown on top of the portions) is created procedurally by use of spherical coordinates in the following manner. For example, CPU 16 may implement the example techniques to generate the texture map and the 3D mesh model. The spherical geometry is comprised of multiple parallel rings. Each of these parallel rings is created by creating a set of coordinate points in 3D space that form a circle. Each circle contains the same number of coordinate points, also known as vertices. Each vertex X,Y,Z position is calculated for a unit half sphere of radius 1 by:

$x = \text{cosine}(\text{azimuth angle}) * \text{sine}(\text{altitude angle}) * \text{radius};$ $y = \text{sine}(\text{azimuth angle}) * \text{sine}(\text{altitude angle}) * \text{radius};$ $z = \text{cosine}(\text{azimuth angle}) * \text{radius};$ Where radius=1, and Where the azimuth angle ranges from 0 to 360-degrees with any desired but constant increment angle, e.g. 3 degrees, and Where the altitude angle ranges from 0 to 90 degrees with any desired but constant increment angle, e.g. 4.5 degrees.

One or more extra rings of the same maximum radius maybe created by keeping the altitude angle at 90 degrees and generating additional vertex values to create the ring geometry.

The 2D texture coordinates (expressed as U, V) for each corresponding vertex are generated by:

$U = \text{cosine}(\text{azimuth angle}) * \text{radius} * \text{scale};$ $V = \text{sine}(\text{azimuth angle}) * \text{radius} * \text{scale};$ Where the azimuth angle ranges from 0 to 360-degrees with any desired but constant increment angle, e.g. 3 degrees, and Radius ranges from 0.0 to 1.0, and is incremented by a constant value, depending on the number of rings desired.

The increment value is calculated by 1 divided by number of rings. For all texture coordinate rings except for the last ring, this constant value may be used. For the last ring, the radius increment is reduced by a certain factor. This "last radius increment" is determined visually, manually, for a given fisheye lens and depends on the field of view of the fisheye lens. For a 200-degree field of view lens, a value of approximately 0.77 was found to be appropriate. This value may be used to automatically determine appropriate values for different lenses based on known field of view.

Scale is used to adjust the radius. The radius may need to be reduced to avoid using pixels that may be undesirable. Undesirable pixels may be due to extreme compression, lack of detail, chromatic aberration, occlusion by camera body, or other reasons. This scale factor for a 200-degree field of view lens was manually found to be 0.954. Other values may be manually determined for other lens configurations, and used to extrapolate values for any lens. The values may be stored in a look-up table and selected based on parameters of lenses 12A and 12B, may be pre-generated and stored, or may be user selected as well.

When the values U,V have been calculated above, the value may be in a possible range of −1.0 to +1.0. The values are normalized into a range of 0. to 1.0 domain, for example, by:

$\text{Normalized\_}U = (U/2.0) + 0.5$ $\text{Normalized\_}V = (V/2.0) + 0.5$

A uniform or non-uniform scale may be applied during this stage of the calculation as a secondary adjustment, similar to the "Scale" applied in the previous stage. This may be described as $\text{Normalized\_}U = ((U/2.0) * \text{adjust\_}U) + 0.5$ $\text{Normalized\_}V = ((V/2.0) * \text{adjust\_}V) + 0.5$ where adjust_U and adjust_V are floating point values, usually very close to 1.0, e.g., 1.0025

Vertex positions are calculated in the same order and as the texture coordinates are calculated; therefore the 1 to 1 correspondence is available. The connecting of the vertices is done by connecting neighboring vertices in a given ring together, along with the 2 corresponding vertices in the next adjacent ring of larger radius. These 4 vertices create a polygon in the mesh geometry.

The above was described with respect to manual adjustment to generate a texture map similar to that of FIG. 5. However, in some examples, CPU 16 or some other device may generate a texture map based on the camera parameters of lens 12A and 12B. For example, CPU 16 or some other device may use a black and white checkerboard and a process described in Scaramuzza, "OCamCalib: Omnidirectional Camera Calibration Toolbox for Matlab," the contents of which are incorporated by reference in their entirety to determine a "calibrated" texture map, versus the manual adjusted texture map illustrated in FIG. 5.

The calibrated texture map may be similar to the manual adjusted texture map illustrated in FIG. 5 (e.g., texture map 56). However, the width of the rings of the calibrated texture map may differ than those illustrated in texture map 56 of FIG. 5. For example, the width of some of the inner rings may be wider or narrower than the width of some of the outer rings. As an example, in the calibrated texture map, it may be possible for an outer ring to be wider than an inner ring. In general, in the calibrated texture map, the width of the rings may vary (e.g., some may be relatively narrower and some may be relatively wider). In examples, where a calibrated texture map is generated, the texture coordinates for the calibrated texture map may be stored in texture coordinates buffer 52 of memory 30, and used similar to texture map 56 illustrated in FIG. 5.

Figure 10:
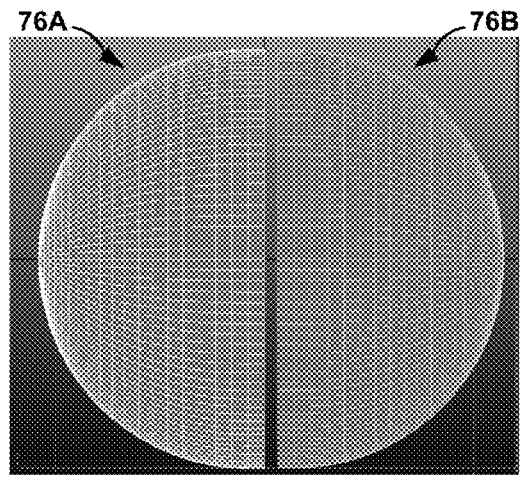
FIG. 10 is a conceptual diagram illustrating two 3D mesh models.

FIG. 10 is a conceptual diagram illustrating two 3D mesh models. For example, FIG. 10 illustrates 3D mesh model 76A and 3D mesh model 76B. 3D mesh model 76A and 76B may have a sub-capsule shape. In some examples, a width of a first ring in 3D mesh model is 76A less than a width of a second ring in 3D mesh model 76A. The same be true for 3D mesh model 76B.

3D mesh model 76A may be a first 3D mesh model on which GPU 18 overlays a first circular image to generate a first portion of image content. For example, GPU 18 may texture map a texture primitive from a first circular image, where the texture primitive is defined by texture map 56, onto a primitive of 3D mesh model 76A as defined by application 34. 3D mesh model 76B may be a second 3D mesh model on which GPU 18 overlays a second circular image to generate a second portion of image content. For instance, GPU 18 may texture map a texture from a second circular image, where the texture primitive is defined by texture map 56, onto a primitive of 3D mesh model 76B as defined by application 34. In GPU 18 constructing the two portions of the image content from the two 3D mesh models 76A and 76B, as illustrated in FIG. 10, the two portions may not be exactly half of the sphere that forms the 360-degree image. Rather, each of the two portions may be more than half a sphere (e.g., sub-capsule).

Figure 11:
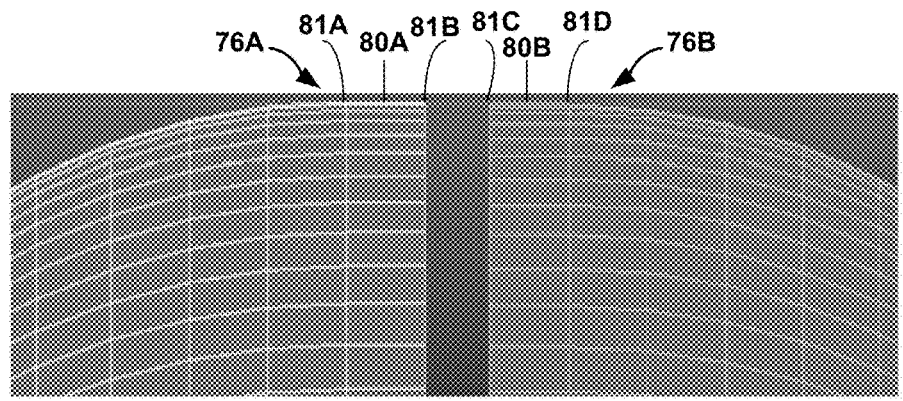
FIG. 11 is a conceptual diagram illustrating the same radius for the last two loops in each portion.

FIG. 11 is a conceptual diagram illustrating the same radius for last two loops (e.g., which are formed by the last two rings of the texture coordinates) in each portion. For instance, FIG. 11 illustrates the last ring 80A of 3D mesh model 76A, and the last ring 80B of 3D mesh model 76B. Last ring 80A includes border 81A and 81B, and last ring 80B includes border 81C and 81D. Border 81A, 81B, 81C, and 81D each for respective loops, such that last rings 80A and 80B form thin cylinders. In some examples, last rings 80A and 80B may be formed such that the radius of border 81A and 81B is the same, and the radius of border 81C and 81D is the same. Further, in some examples, last rings 80A and 80B may be formed such that the radius of border 81A, 81B, 81C, and 81D is all the same.

For instance, the texture coordinates of last rings 80A and 80B that may be formed such that the last rings 80A and 80B is the same radius as the ring that was at the precise half (e.g., the portions are more like a capsule). The precise half refers to the mid-point of the sphere such that a cross section at the precise half would be the radius of the sphere.

Figure 12:
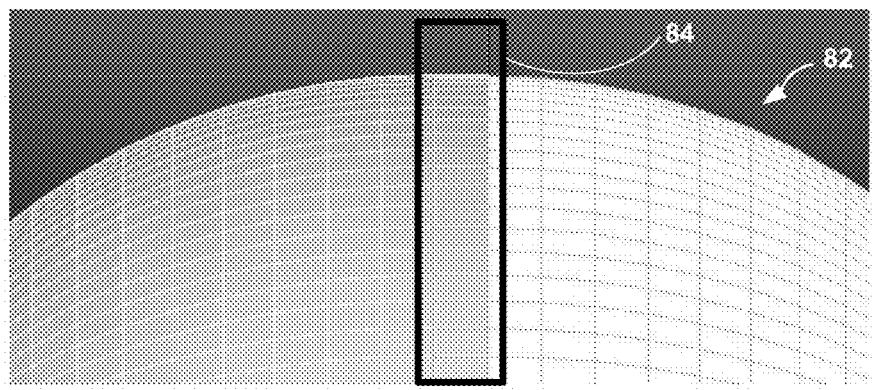
FIG. 12 is a conceptual diagram illustrating overlap between the two portions of FIG. 11.

FIG. 12 is a conceptual diagram illustrating overlap between the portions of FIG. 11. For example, GPU 18 may stitch the first portion generated from 3D mesh model 76A and the second portion generated from 3D mesh model 76B to generate a sphere of image content represented by sphere 82 of FIG. 12. In generating sphere 82, GPU 18 may have rendered and blended last rings 80A and 80B. For instance, last rings 80A and 80B of FIG. 11 may include substantially the same image content. Accordingly, when stitching the first portion and the second portion, one of last rings 80A or 80B overlaps the other one of last rings 80A or 80B. In the example illustrated in FIG. 12, overlap region 84 is illustrated as the first portion generated from 3D mesh model 76A overlapping the second portion generated from 3D mesh model 76B. Overlap region 84, as illustrated in FIG. 12, may be used for blending and alignment of the two fisheye images.

Figure 13:
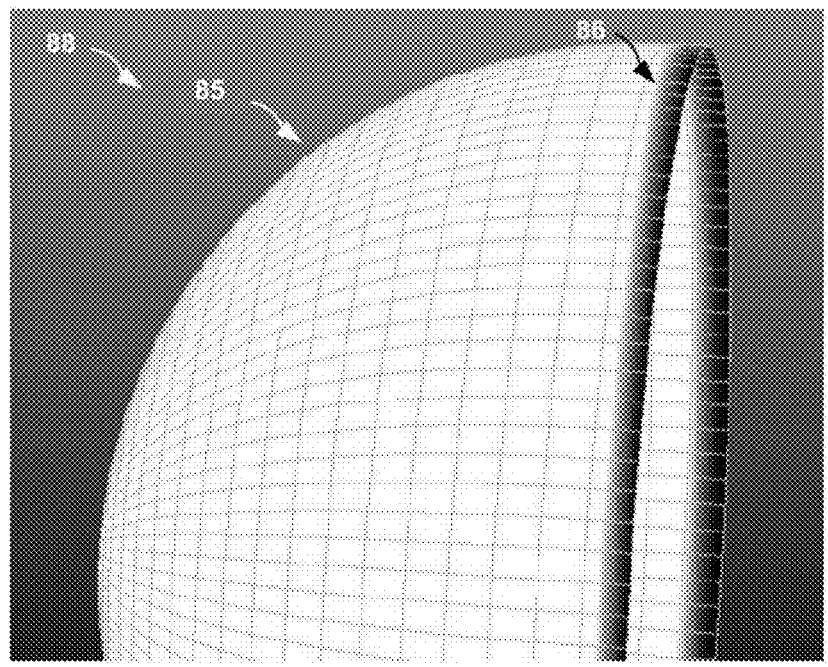
FIGS. 13 and 14 are conceptual diagrams illustrating a mask used for the 360-degree video.
Figure 14:
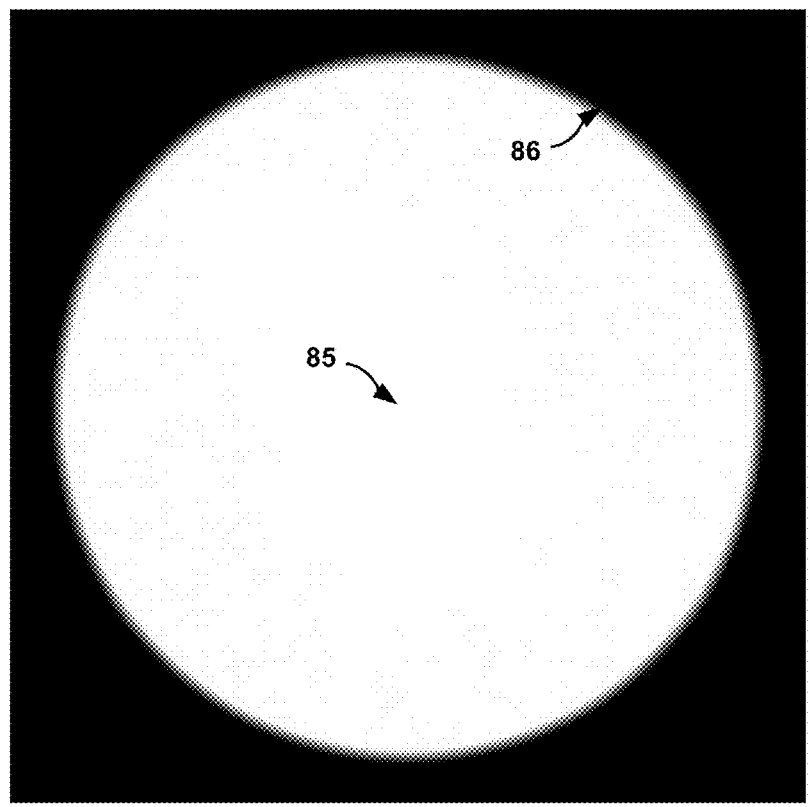

FIGS. 13 and 14 are conceptual diagrams illustrating a mask used for rendering the 360-degree video. The mask illustrated in FIG. 14 may be the same as the mask 88 illustrated in FIG. 13 shown from a different orientation. Mask 88, such as illustrated in FIG. 13, may be used to assign blending factors used for blending the first and second rendered portions. GPU 18 may generate a very precise mask by rendering a color per vertex disk, where GPU 18 may use texture hardware circuit to perform such operations.

For example, the primitives of mask 88 may be same as the primitives of mesh model 76A or 76B (e.g., 3D mesh model 76A in this example). The primitives of mask 88 are located in the same position as the primitives of the first portion or the second portion because the first portion or the second portion primitives are defined by primitives of 3D mesh model 76A or 76B. Therefore, mask 88 may be a very accurate mask for assigning blending factors. In other words, the vertex positions used to render the disk get their values from the texture coordinates of the half sphere geometry, which also form a disk. Because the texture coordinates define the relationship of the geometry to pixels, this blending mask will be very accurate.

In the example illustrated in FIG. 13, mask 88 includes two mask regions: mask region 85 and mask region 86. The values of mask 88 ranges from 0 (transparent) to 1 (opaque). In the example illustrated in FIGS. 13 and 14, a value of 1 may be considered as white and a value of 0 may be considered as black. Again, FIGS. 13 and 14 are not illustrating an actual image that is rendered, but instead what mask 88 would appear like if rendered.

As illustrated, in mask region 85, the color is white. This is because none of the image content of a first portion or a second portion will be blended in mask region 85 (e.g., the image content is opaque). In mask region 86, however, the color gradually changes from white, to gray, to dark gray, and then to black. In this example, in mask region 86, as the region gradually changes to black, more and more blending occurs with the other portion (e.g., in areas where the value of mask region 86 is 0.5, there is equal contribution from the first portion and the second portion in blending the image content).

As noted, FIG. 14 illustrates what mask 88 of FIG. 13 would appear like if rendered. As can be seen, the middle of FIG. 14 illustrates mask region 85 where there is little blending. Closer to the edge, mask region 85 changes to mask region 86 where there is more blending as indicative of the color changing from white to shades of gray, and then black.

Accordingly, in example techniques illustrated with respect to FIGS. 5-9, polar coordinates may be used to generate texture coordinates for 3D polygon mesh models. The texture coordinates may be arranged as concentric rings, with each ring including a plurality of rectangular primitives (as one example). The vertices of the primitives form the texture coordinates. The last ring of the 2D texture coordinate may be shorter (e.g., thinner) than all of the other rings; although not a requirement. In some examples, one or more of the outer rings may be shorter than earlier rings. In some examples, the outer most ring may be the shortest, the next outer ring may be bigger than the outermost ring but shorter than the following outer ring, and so forth for a plurality of rings and then the size of the remaining rings is the approximately the same.

Processing circuitry may blend the video content from the two portions to generate the 360-degree video. In the example techniques, the processing circuitry may use the overlap to determine how to blend the two portions with alpha blending for seamless blending. Furthermore, because the last ring in the texture coordinates is of relatively smaller size than the rest of the rings, the amount of area relied upon for controlling the blending may be relatively small, allowing for fast processing and blending of the video content from the two portions.

Figure 15:
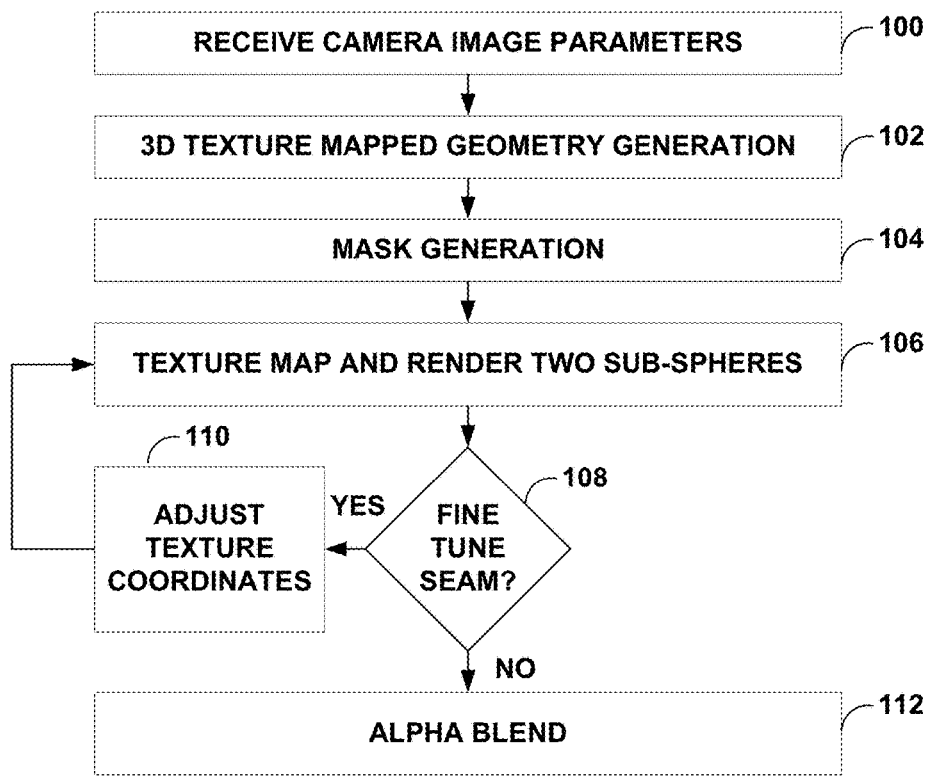
FIG. 15 is a flowchart illustrating an example method of operation according to one or more example techniques described in this disclosure.

FIG. 15 is a flowchart illustrating an example method of operation according to one or more example techniques described in this disclosure. CPU 16 (e.g., via camera processor 14) may receive camera image parameters (100). The camera image parameters may be information such as a number of pixels in image, the center point of the images, and other such information. The information may be available in a table that CPU 16 accesses. The camera image parameters need not always be available.

CPU 16 may perform operations for 3D texture mapped geometry generation (102). For example, CPU 16 may generate the texture coordinates, vertex position, and connectivity information that are to be used by GPU 18 for the texture mapping. As an example, CPU 16 may generate a first set of vertex coordinates for a first 3D mesh model, and generate a second set of vertex coordinates for a second 3D mesh model. CPU 16. As described above, one example way to generate the first and second sets of vertex coordinates is that application 34 defines the primitives for a 3D mesh model and stores the vertex coordinates in vertex coordinates buffer 46.

In addition to the 3D mesh model, CPU 16 may generate the texture map and store the texture coordinates for the texture map in texture coordinates buffer 52. In some examples, the texture map and its texture coordinates for the texture primitives may be pre-stored in texture coordinates buffer 52. In other examples, CPU 16 may utilize the camera image parameters information, if available, to determine the texture coordinates for the texture primitives for storage in texture coordinates buffer 52. The texture coordinates may be based on vertices of primitives that form a pattern of concentric rings. In some examples, a width of one or more outer rings of the concentric rings is less than a width of other rings of the concentric rings.

CPU 16 may also generate mask texture 54 and store mask texture 54 in system memory 30 (104). For example, application 34 or another application called by operating system 39 may generate and store mask texture 54 in system memory 30.

GPU 18 may texture map and render the two portions (106). For example, GPU 18 may perform the texture mapping to map the images from lenses 12A and 12B based on texture coordinates illustrated in FIG. 5, and GPU 18 may perform mask mapping to generate the mask that indicates the percentage of the video content that is to be included when blending between the overlapping image content of the two portions.

As an example, controller 40 may receive an instruction of a plurality of instructions from application 34 (e.g., via graphics API 36 and GPU driver 38) to retrieve a first set of vertex coordinates for a first 3D mesh model. In response, controller 40 may receive the first set of vertex coordinates from vertex coordinates buffer 46.

Controller 40 may also receive instructions from application 34 to cause shader core 42 to execute a vertex shader, and in response, the programmable circuitry of shader core 42 executes the vertex shader for processing the first set of vertex coordinates. Part of the instructions to process the first set of vertex coordinates includes the coordinates of a primitive of the first mesh model and corresponding texture coordinates from texture coordinates buffer 52 for a corresponding texture primitive. This corresponding texture primitive may be primitive within first circular image 48.

For example, shader core 42 may execute instructions, issued by application 34, that cause GPU 18 to load the texture primitive from first circular image 48 based on the texture coordinates retrieved from texture coordinates buffer 52. A texture hardware circuit (e.g., one of fixed-function units 44) may overlay the loaded texture primitive on top of the primitive of the first 3D mesh model defined by vertex coordinates of the first set of vertex coordinates. Shader core 42 and the texture hardware circuit may repeat these operations for different the primitives of the first 3D mesh model to overlay a first image (e.g., first circular image 48) based on the first set of vertex coordinates to generate a first portion of the image content.

In this way, shader core 42 may receive a first set of texture coordinates that correspond to the first set of vertex coordinates for the first 3D mesh model, where the first set of texture coordinates are coordinates of pixels within a first image (e.g., first circular image 48). To overlay the first image on the first 3D mesh model based on first set of vertex coordinates, the texture hardware circuit may texture map the first circular image 48 on the first 3D mesh model based on the first set of texture coordinates. CPU 16 may have generated the first set of texture coordinates based on vertices of primitives that form a pattern of concentric rings, where a width of one or more outer rings of the concentric rings is less than a width of other rings of the concentric rings. The mapping of vertices of primitives in the one or more outer rings of the concentric rings to vertices in the first set of vertex coordinates for the first 3D mesh model causes image content in the first image (e.g., first circular image 48) that corresponds to the one or more outer rings to be stretched onto the first 3D mesh model.

Controller 40 may receive an instruction of a plurality of instructions from application 34 (e.g., via graphics API 36 and GPU driver 38) to retrieve a second set of vertex coordinates for a second 3D mesh model. In response, controller 40 may receive the second set of vertex coordinates from vertex coordinates buffer 46.

Controller 40 may also receive instructions from application 34 to cause shader core 42 to execute a vertex shader, and in response, the programmable circuitry of shader core 42 executes the vertex shader for processing the second set of vertex coordinates. Part of the instructions to process the second set of vertex coordinates includes the coordinates of a primitive of the second mesh model and corresponding texture coordinates from texture coordinates buffer 52 for a corresponding texture primitive. This corresponding texture primitive may be primitive within second circular image 50.

For example, shader core 42 may execute instructions, issued by application 34, that cause GPU 18 to load the texture primitive from second circular image 50 based on the texture coordinates retrieved from texture coordinates buffer 52. A texture hardware circuit (e.g., one of fixed-function units 44) may overlay the loaded texture primitive on top of the primitive of the second 3D mesh model defined by vertex coordinates of the second set of vertex coordinates. Shader core 42 and the texture hardware circuit may repeat these operations for different the primitives of the second 3D mesh model to overlay a second image (e.g., second circular image 50) based on the second set of vertex coordinates to generate a second portion of the image content.

In this way, shader core 42 may receive a second set of texture coordinates that correspond to the second set of vertex coordinates for the second 3D mesh model, where the second set of texture coordinates are coordinates of pixels within a second image (e.g., second circular image 50). To overlay the second image on the second 3D mesh model based on second set of vertex coordinates, the texture hardware circuit may texture map the second circular image 50 on the second 3D mesh model based on the second set of texture coordinates. CPU 16 may have generated the second set of texture coordinates based on vertices of primitives that form a pattern of concentric rings, where a width of one or more outer rings of the concentric rings is less than a width of other rings of the concentric rings. The mapping of vertices of primitives in the one or more outer rings of the concentric rings to vertices in the first set of vertex coordinates for the second 3D mesh model causes image content in the second image (e.g., second circular image 50) that corresponds to the one or more outer rings to be stretched onto the second 3D mesh model.

The sphere of image content includes 360-degrees of viewable content. First circular image 48 and second circular image 50 include more than 180-degrees of image content. Therefore, the first portion and the second portion include overlapping image content of the sphere of image content.

GPU 18 may render the first portion and the second portion to generate a first rendered portion and a second rendered portion. As part of the rendering, GPU 18 may convert the 3D pixel coordinates into 2D screen coordinates, and execute a pixel shader to determine color values for each of the pixels on display 28. based on the overlapping image content to generate the sphere of image content.

GPU 18 may determine if there is need to fine tune the seam (108). For instance, fine tuning the seam may be a quality control. Given 3D render camera look direction, GPU 18 may determine if the two portions are both visible. If so, GPU 18 may determine the area of overlap, which is narrow. For example, the area of overlap may be pixels in the first and second rendered portions having the same <x,y> coordinates. GPU 18 may compute a metric to determine the similarity between the two overlapping rendered pixels (e.g., sum of absolute differences or maxim of absolute differences). If similar, GPU 18 may determine and in some examples output "Quality Accepted," else "Quality Not Accepted." Because the overlap area is narrow, the computation time may be relatively fast, possibly at real-time speeds.

If the quality is accepted, GPU 18 may perform alpha blending (112) (NO of 108). For example, the blender circuit of GPU 18 may scale the pixels of the first and second reference portions based on the respective opacity values determined from the texture mapping of mask texture 54. GPU 18 may then add the two pixel values together or perform some other blending technique to generate blended pixel values for the overlapping image content in the first and second rendered portions. In this way, GPU 18 may generate a sphere of image content based at least in part on blending the first and second rendered portions based on the overlapping image content.

If, however, the quality is not accepted, there may be a visual seam. If there is a visual seam, the texture coordinates of one or more both portions may be adjusted by CPU 16 by warping them (110) (YES of 108). The warping may be done by CPU 16 by leveraging GPU/OpenGL rendering using texture coordinates. By shifting, rotating and/or scaling the appropriate texture coordinates, adjustments can be made. Once an adjustment is made (via guessing within a range), the image can be sent back to determine whether to fine tune for further analysis (106). The removal of the seam need not necessarily be complete since the blending mask hides many of the seams. A seam of a few pixels is not very noticeable to the human eye, depending on the image content.

Accordingly, in some examples, GPU 18 (e.g., ALUs or EFUs of GPU 18) may determine a similarity between the overlapping image content. CPU 16 may adjust at least one of the first set of texture coordinates or the second set of texture coordinates. In such examples, GPU 18 may texture map the first image on the first 3D mesh model based on adjusted first set of texture coordinates in response to the first set of texture coordinates being adjusted, or GPU 18 may texture map the second image on the second 3D mesh model based on the adjusted second set of texture coordinates in response to the second set of texture coordinates being adjusted.

In some examples, FIG. 15 may be considered as applying to run-time processes. For example, at the time of manufacture, a static calibration may be used to determine how to adjust the texture coordinates. In such examples, adjustment of the texture coordinates (e.g., box 92) may not be needed in run-time.

In one or more example techniques, the disclosure describes performing circular fisheye image stitching that may not require an initial transformation of the circular fisheye image into a flat rectangular image for intermediate stitching. The techniques may be implemented with graphics processing instead of vision processing, allowing for fast generation of the video content. There may be creation of 3D geometry with 2D texture coordinates that take fisheye image compression into account. The creation of a capsule overlap region that allows for a well-defined overlap area that can be blended quickly using GPU 18. There may be creation of a precise mask needed for blending circular images. The example techniques may perform seam analysis only as needed, in visible rendered areas. The example techniques may use texture coordinate distortion to distort circular images for the purpose of image seam correction. The example techniques may result in high performance (approximately 10 ms per frame), leveraging GPU 18, and pre-computing the majority of calculations beforehand and embedding the results as render data.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for generating image content, the method comprising:
    texture mapping a first image on a first three-dimensional (3D) mesh model based on a first set of texture coordinates that correspond to a first set of vertex coordinates for the first 3D mesh model to generate a first portion of image content, wherein the first set of texture coordinates are coordinates of pixels within the first image, and are based on vertices of primitives that form a pattern of concentric rings, and wherein a width of one or more rings of the concentric rings is less than a width of another of the concentric rings;
    texture mapping a second image on a second 3D mesh model based on a second set of texture coordinates that correspond to a second set of vertex coordinates for the second 3D mesh model to generate a second portion of the image content, wherein the first portion and the second portion include overlapping image content, wherein the second set of texture coordinates are coordinates of pixels within the second image, and wherein the second set of texture coordinates are based on the vertices of the primitives that form the pattern of concentric rings;
    rendering the first portion and the second portion to generate a rendered first portion and a rendered second portion, respectively; and
    generating a sphere of image content based at least in part on blending the first rendered portion and the second rendered portion based on the overlapping image content.

2. The method of claim 1, further comprising:
    receiving the first set of vertex coordinates for the first 3D mesh model; and
    receiving the second set of vertex coordinates for the second 3D mesh model,
    wherein the first 3D mesh model and the second 3D mesh model are a same 3D mesh model.

3. The method of claim 1, wherein the first 3D mesh model and the second 3D mesh model each comprise a plurality of rings disposed about a common longitudinal axis, and wherein each of the rings comprises a plurality of the primitives.

4. The method of claim 3, wherein a width of a first ring in the first 3D mesh model is less than a width of a second ring in the first 3D mesh model, and wherein a width of a first ring in the second 3D mesh model is less than a width of a second ring in the second 3D mesh model.

5. The method of claim 3, wherein the first 3D mesh model and the second 3D mesh model each have a shape of a sub-capsule, wherein the longitudinal axis comprises an axis extending from a center point of one end of the sub-capsule to a tip of the sub-capsule, and wherein the plurality of primitives of the plurality of rings are disposed between the end of the sub-capsule and the tip of the sub-capsule.

6. The method of claim 5, wherein the first 3D mesh model and the second 3D mesh model each have the shape of a sub-ovoid.

7. The method of claim 1, wherein the sphere of image content includes 360-degrees of viewable content, wherein the first image comprises a first circular image that includes more than 180-degrees of the image content, and wherein the second image comprises a second circular image that includes more than 180-degrees of the image content.

8. The method of claim 1,
    wherein texture mapping the first image comprises mapping the vertices of the primitives that form the pattern of concentric rings to the first set of vertex coordinates for the first 3D mesh model,
    wherein the mapping of the vertices of the primitives in the one or more rings of the concentric rings having the width less than the width of another of the concentric rings to vertices in the first set of vertex coordinates for the first 3D mesh model causes image content in the first image that corresponds to the one or more of the concentric rings having the width less than the width of another of the concentric rings to be stretched onto the first 3D mesh model, and wherein texture mapping the second image comprises mapping the vertices of the primitives that form the pattern of concentric rings to the second set of vertex coordinates for the second 3D mesh model, wherein the mapping of the vertices of the primitives in the one or more rings of the concentric rings having the width less than the width of another of the concentric rings to vertices in the second set of vertex coordinates for the second 3D mesh model causes image content in the second image that corresponds to the one or more of the concentric rings having the width less than the width of another of the concentric rings to be stretched onto the second 3D mesh model.

9. The method of claim 1, further comprising:

generating a mask based on at least one of the first set of texture coordinates or the second set of texture coordinates, the mask indicating blending factors for the first portion of the image content and the second portion of the image content;

texture mapping the mask on the first portion and the second portion to assign blending factors to pixels of the first portion and the second portion, wherein blending the first rendered portion of the image content and the second rendered portion of the image content comprises blending the overlapping image content of the first rendered portion of the image content and the second rendered portion of the image content based on the blending factors.

10. The method of claim 1, further comprising:

determining similarity between the overlapping image content; and adjusting at least one of the first set of texture coordinates or the second set of texture coordinates based on the determined similarity, wherein texture mapping the first image on the first 3D mesh model based on the first set of texture coordinates comprises texture mapping the first image on the first 3D mesh model based on an adjusted first set of texture coordinates in response to the first set of texture coordinates being adjusted, and wherein texture mapping the second image on the first 3D mesh model based on the second set of texture coordinates comprises texture mapping the second image on the second 3D mesh model based on an adjusted second set of texture coordinates in response to the second set of texture coordinates being adjusted.

11. The method of claim 1, wherein the first image is captured by a first fisheye lens, and the second image is captured by a second fisheye lens.

12. The method of claim 1, further comprising:

capturing the first image with a first fisheye lens of a fisheye camera device; and capturing the second image with a second fisheye lens of the fisheye camera device, wherein blending the first rendered portion and the second rendered portion comprises blending, with the fisheye camera device that includes the first and second fisheye lenses, the first rendered portion and the second rendered portion.

13. The method of claim 1, further comprising:

receiving, with a processing device and from a fisheye camera device that includes a first fisheye lens and a second fisheye lens, the first image and the second image, wherein the first fisheye lens captured the first image and the second fisheye lens captured the second image, wherein blending the first rendered portion and the second rendered portion comprises blending, with the processing device, the first rendered portion and the second rendered portion.

14. The method of claim 1, wherein the width of one or more rings of the concentric rings being less than the width of another of the concentric rings comprises a width of one or more outer rings of the concentric rings being less than widths of other rings of the concentric rings.

15. A device for generating image content, the device comprising:

a memory configured to store a first image and a second image; and a graphics processing unit (GPU) comprising at least one of fixed-function or programmable circuitry configured to:

texture map the first image stored in the memory on a first three-dimensional (3D) mesh model based on a first set of texture coordinates that correspond to a first set of vertex coordinates for the first 3D mesh model to generate a first portion of image content, wherein the first set of texture coordinates are coordinates of pixels within the first image, and are based on vertices of primitives that form a pattern of concentric rings, and wherein a width of one or more rings of the concentric rings is less than a width of another of the concentric rings;

texture map the second image stored in the memory on a second 3D mesh model based on a second set of texture coordinates that correspond to a second set of vertex coordinates for the second 3D mesh model to generate a second portion of the image content, wherein the first portion and the second portion include overlapping image content, wherein the second set of texture coordinates are coordinates of pixels within the second image, and wherein the second set of texture coordinates are based on vertices of primitives that form the pattern of concentric rings;

render the first portion and the second portion to generate a rendered first portion and a rendered second portion, respectively; and generate a sphere of image content based at least in part on blending the first rendered portion and the second rendered portion based on the overlapping image content.

16. The device of claim 15, wherein the first 3D mesh model and the second 3D mesh model each comprise a plurality of rings disposed about a common longitudinal axis, and wherein each of the rings comprises a plurality of the primitives.

17. The device of claim 16, wherein the first 3D mesh model and the second 3D mesh model each have a shape of a sub-capsule, wherein the longitudinal axis comprises an axis extending from a center point of one end of the sub-capsule to a tip of the sub-capsule, and wherein the plurality of primitives of the plurality of rings are disposed between the end of the sub-capsule and the tip of the sub-capsule.

18. The device of claim 17, wherein the first 3D mesh model and the second 3D mesh model each have the shape of a sub-ovoid.

19. The device of claim 15, wherein the sphere of image content includes 360-degrees of viewable content, wherein the first image comprises a first circular image that includes more than 180-degrees of the image content, and wherein the second image comprises a second circular image that includes more than 180-degrees of the image content.

20. The device of claim 15,
wherein to texture map the first image, the GPU is configured to map the vertices of the primitives that form the pattern of concentric rings to the first set of vertex coordinates for the first 3D mesh model,
wherein the mapping of the vertices of the primitives in the one or more rings of the concentric rings having the width less than the width of another of the concentric rings to vertices in the first set of vertex coordinates for the first 3D mesh model causes image content in the first image that corresponds to the one or more of the concentric rings having the width less than the width of another of the concentric rings to be stretched onto the first 3D mesh model, and
wherein to texture map the second image, the GPU is configured to map the vertices of the primitives that form the pattern of concentric rings to the second set of vertex coordinates for the second 3D mesh model,
wherein the mapping of the vertices of the primitives in the one or more rings of the concentric rings having the width less than the width of another of the concentric rings to vertices in the second set of vertex coordinates for the second 3D mesh model causes image content in the second image that corresponds to the one or more of the concentric rings having the width less than the width of another of the concentric rings to be stretched onto the second 3D mesh model.

21. The device of claim 15,
wherein at least one of the processor or the GPU is configured to generate a mask based on at least one of the first set of texture coordinates or the second set of texture coordinates, the mask indicating blending factors for the first portion of the image content and the second portion of the image content,
wherein the GPU is configured to texture map the mask on the first portion and the second portion to assign blending factors to pixels of the first portion and the second portion, and
wherein the GPU is configured to blend the overlapping image content of the first rendered portion of the image content and the second rendered portion of the image content based on the blending factors.

22. The device of claim 15, wherein at least one of the processor or GPU is configured to:
determine similarity between the overlapping image content; and
adjust at least one of the first set of texture coordinates or the second set of texture coordinates based on the determined similarity,
wherein to texture map the first image on the first 3D mesh model based on the first set of texture coordinates, the GPU is configured to texture map the first image on the first 3D mesh model based on an adjusted first set of texture coordinates in response to the first set of texture coordinates being adjusted, and
wherein to texture map the second image on the first 3D mesh model based on the second set of texture coordinates, the GPU is configured to texture map the second image on the second 3D mesh model based on an adjusted second set of texture coordinates in response to the second set of texture coordinates being adjusted.

23. The device of claim 15, wherein the device comprises a camera device, the device further comprising:
a first fisheye lens configured to capture the first image; and
a second fisheye lens configured to capture the second image.

24. The device of claim 15, wherein the GPU is configured to receive from a fisheye camera device that includes a first fisheye lens and a second fisheye lens, the first image and the second image, wherein the first fisheye lens captured the first image and the second fisheye lens captured the second image.

25. The device of claim 15, wherein the device comprises one or more of a camera, a computer, a mobile device, a broadcast receiver device, or a set-top box.

26. The device of claim 15, wherein the width of one or more rings of the concentric rings being less than the width of another of the concentric rings comprises a width of one or more outer rings of the concentric rings being less than widths of other rings of the concentric rings.

27. A device for generating image content, the device comprising:
means for texture mapping a first image on a first three-dimensional (3D) mesh model based on a first set of texture coordinates that correspond to a first set of vertex coordinates for the first 3D mesh model to generate a first portion of image content, wherein the first set of texture coordinates are coordinates of pixels within the first image, and are based on vertices of primitives that form a pattern of concentric rings, and wherein a width of one or more rings of the concentric rings is less than a width of another of the concentric rings;
means for texture mapping a second image on a second 3D mesh model based on a second set of texture coordinates that correspond to a second set of vertex coordinates for the second 3D mesh model to generate a second portion of the image content, wherein the first portion and the second portion include overlapping image content, wherein the second set of texture coordinates are coordinates of pixels within the second image, and wherein the second set of texture coordinates are based on the vertices of the primitives that form the pattern of concentric rings;
means for rendering the first portion and the second portion to generate a rendered first portion and a rendered second portion, respectively; and
means for generating a sphere of image content based at least in part on blending the first rendered portion and the second rendered portion based on the overlapping image content.

28. The device of claim 27, wherein the width of one or more rings of the concentric rings being less than the width of another of the concentric rings comprises a width of one or more outer rings of the concentric rings being less than widths of other rings of the concentric rings.

29. A computer-readable storage medium comprising instructions that when executed cause one or more processors of a device for generating image content to:
texture map a first image on a first three-dimensional (3D) mesh model based on a first set of texture coordinates that correspond to a first set of vertex coordinates for the first 3D mesh model to generate a first portion of image content, wherein the first set of texture coordinates are coordinates of pixels within the first image, and are based on vertices of primitives that form a pattern of concentric rings, and wherein a width of one or more rings of the concentric rings is less than a width of another of the concentric rings;

texture map a second image on a second 3D mesh model based on a second set of texture coordinates that correspond to a second set of vertex coordinates for the second 3D mesh model to generate a second portion of the image content, wherein the first portion and the second portion include overlapping image content, wherein the second set of texture coordinates are coordinates of pixels within the second image, and wherein the second set of texture coordinates are based on the vertices of the primitives that form the pattern of concentric rings;

render the first portion and the second portion to generate a rendered first portion and a rendered second portion, respectively; and generate a sphere of image content based at least in part on blending the first rendered portion and the second rendered portion based on the overlapping image content.

30. The computer-readable storage medium of claim 29, wherein the width of one or more rings of the concentric rings being less than the width of another of the concentric rings comprises a width of one or more outer rings of the concentric rings being less than widths of other rings of the concentric rings.

* * * * *